US007842443B2

(12) United States Patent
Yamazaki et al.

(10) Patent No.: US 7,842,443 B2
(45) Date of Patent: Nov. 30, 2010

(54) METHOD FOR EVALUATING ELECTROPHOTOGRAPHIC PHOTOCONDUCTOR AND THE EVALUATION DEVICE, AND METHOD FOR REUSING ELECTROPHOTOGRAPHIC PHOTOCONDUCTOR

(75) Inventors: Junichi Yamazaki, Mishima (JP); Shigemitsu Nakatsugawa, Hadano (JP); Kenji Maeda, Isehara (JP)

(73) Assignee: Ricoh Company, Ltd., Tokyo (JP)

(*) Notice: Subject to any disclaimer, the term of this patent is extended or adjusted under 35 U.S.C. 154(b) by 1016 days.

(21) Appl. No.: 11/563,551

(22) Filed: Nov. 27, 2006

(65) Prior Publication Data

US 2007/0122185 A1 May 31, 2007

(30) Foreign Application Priority Data

Nov. 28, 2005 (JP) ............................ 2005-341963
Jul. 5, 2006 (JP) ............................ 2006-185507

(51) Int. Cl.
*G03G 15/02* (2006.01)
*G01N 21/00* (2006.01)

(52) U.S. Cl. .................. 430/30; 430/58.05; 430/58.35; 430/66; 430/123.42; 430/139

(58) Field of Classification Search ............. 430/111.4, 430/110.1, 111.1, 137.21, 139, 58.05, 58.35, 430/66, 123.42, 30; 355/78
See application file for complete search history.

(56) References Cited

U.S. PATENT DOCUMENTS 4,637,938 A 1/1987 Lee et al.
4,642,526 A * 2/1987 Hopkins ..................... 315/244
4,758,486 A 7/1988 Yamazaki et al.
5,717,626 A * 2/1998 Aoki et al. .................. 365/112
5,991,569 A 11/1999 Sugihara et al.
6,070,037 A 5/2000 Sugihara et al.
6,072,967 A 6/2000 Sugihara et al.
6,104,900 A 8/2000 Ishikawa et al.
6,122,469 A 9/2000 Miura et al.
6,296,704 B1 10/2001 Yamazaki
6,328,800 B1 12/2001 Yamazaki
6,336,020 B1 1/2002 Ishikawa et al.
6,534,227 B2 3/2003 Kabata et al.
6,649,313 B2 11/2003 Kabata et al.
6,925,275 B2 8/2005 Yamazaki
6,983,840 B2 1/2006 Yamazaki et al.
7,046,943 B2 5/2006 Yamazaki
2003/0084726 A1 5/2003 Yamazaki et al.
2005/0095033 A1 5/2005 Kusano et al.
2005/0158644 A1* 7/2005 Kondo et al. ............. 430/108.1
2005/0284778 A1 12/2005 Yamazaki et al.

FOREIGN PATENT DOCUMENTS

JP 60-68050 4/1985
JP 4-174440 6/1992
JP 5-35156 2/1993

(Continued)

*Primary Examiner*—Thorl Chea
(74) *Attorney, Agent, or Firm*—Oblon, Spivak, McClelland, Maier & Neustadt, L.L.P.

(57) ABSTRACT

A method for evaluating an electrophotographic photoconductor in terms of filming occurrence is provided that comprises irradiating UV rays having a wavelength of 200 nm to 420 nm onto the electrophotographic photoconductor and measuring fluorescence emitted from the electrophotographic photoconductor.

17 Claims, 22 Drawing Sheets

FOREIGN PATENT DOCUMENTS

| | | | |
|---|---|---|---|
| JP | 6-266029 | | 9/1994 |
| JP | 7-55710 | | 3/1995 |
| JP | 8-6264 | | 1/1996 |
| JP | 8-159977 | | 6/1996 |
| JP | 08-159977 | * | 6/1996 |
| JP | 9-211875 | | 8/1997 |
| JP | 10-91003 | | 4/1998 |
| JP | 2850074 | | 11/1998 |
| JP | 10-319804 | | 12/1998 |
| JP | 11-24299 | | 1/1999 |
| JP | 11-95453 | | 4/1999 |
| JP | 11-119449 | | 4/1999 |
| JP | 11-133830 | | 5/1999 |
| JP | 11-272137 | | 10/1999 |
| JP | 3021294 | | 1/2000 |
| JP | 2000-147953 | | 5/2000 |
| JP | 2000-221704 | | 8/2000 |
| JP | 2000-242145 | | 9/2000 |
| JP | 2000-275876 | | 10/2000 |
| JP | 2001-22225 | | 1/2001 |
| JP | 2001-235682 | | 8/2001 |
| JP | 2001-235886 | | 8/2001 |
| JP | 2001-235989 | | 8/2001 |
| JP | 2002-108161 | | 4/2002 |
| JP | 2002-244314 | | 8/2002 |
| JP | 2002-258522 | | 9/2002 |
| JP | 2002-258523 | | 9/2002 |
| JP | 2002-258532 | | 9/2002 |
| JP | 2002-268240 | | 9/2002 |
| JP | 2002-268271 | | 9/2002 |
| JP | 2002-278098 | | 9/2002 |
| JP | 3368082 | | 11/2002 |
| JP | 2003-66645 | | 3/2003 |
| JP | 2003-98694 | | 4/2003 |
| JP | 2003-215982 | | 7/2003 |
| JP | 2004-38070 | | 2/2004 |
| JP | 2004-86107 | | 3/2004 |
| JP | 3657408 | | 3/2005 |
| JP | 2005-91760 | | 4/2005 |
| JP | 2005-91954 | | 4/2005 |
| JP | 2005-221910 | | 8/2005 |
| JP | 2005-241973 | | 9/2005 |
| JP | 2005-266316 | | 9/2005 |
| JP | 3837245 | | 8/2006 |

* cited by examiner

METHOD FOR EVALUATING ELECTROPHOTOGRAPHIC PHOTOCONDUCTOR AND THE EVALUATION DEVICE, AND METHOD FOR REUSING ELECTROPHOTOGRAPHIC PHOTOCONDUCTOR

BACKGROUND OF THE INVENTION

1. Field of the Invention

The present invention relates to methods for evaluating filming occurrence on electrophotographic photoconductors (hereinafter sometimes referred to as "photoconductor", "latent electrostatic bearing member", or "image bearing member"), devices for evaluating electrophotographic photoconductors, and methods for reusing electrophotographic photoconductors. The "evaluation of filming occurrence" in the present invention encompasses the evaluations with respect to existence or nonexistence of filming, degree of filming, and quantification of filming.

2. Description of the Related Art

In electrophotographic image forming apparatuses, such problems as so-called "filming phenomena" are likely to occur, where paper powders, toner components, fine carrier particles etc. deposit or adhere on surfaces of electrophotographic photoconductors when images are formed repeatedly.

Here, the term "filming phenomena" refers entirely to such phenomena as (i) resins and/or wax ingredients in toners adhere to electrophotographic photoconductors, (ii) silica particles in toners bite into surfaces of electrophotographic photoconductors, (iii) titanium oxide particles in toners bite into surfaces of electrophotographic photoconductors, (iv) degraded substances such as of zinc stearate adhere to electrophotographic photoconductors, and (v) foreign matters including paper powders, carrier fine powders, dusts etc. adhere to electrophotographic photoconductors.

Such "filming phenomena" often appear along circumferential direction of electrophotographic photoconductors, and inferior images such as streaks, image deletion and black voids are likely to generate even the thickness of the filmings being as thin as approximately 0.1 μm, therefore, evaluation of the filming occurrence has been needed.

For instance, Japanese Patent (JP-B) No. 3368082 discloses judgment or evaluation of filming occurrence by visual observation of inspectors. However, there have been problems that initial filming occurrence or slight filmings are significantly difficult to find and the evaluations are often different between individual inspectors.

Japanese Patent Application Laid-Open (JP-A) No. 2004-086107 discloses detection of filming occurrence on the basis of current change of driving motors. However, the current change is negligible at initial filming occurrence or slight filmings, therefore it is considerably difficult to detect correctly the filming occurrence.

In addition, detection of filming occurrence or clearing of filmings is proposed on the basis of change of surface voltages at electrophotographic photoconductors (see JP-A Nos. 2000-242145, 2001-22225, 2000-147953, and 11-133830). However, these proposals are insufficient for detecting accurately the filming occurrence in cases of small change of surface voltages such as at initial filming occurrence or slight filmings. In addition, in cases of local filmings, there exists a problem that the filming cannot be detected unless the voltage-detecting part of devices coincides with the site of the filming.

JP-A No. 11-272137 discloses that another removal of filmings, when potential of photoconductors exceeds a predetermined level, brings about accurate timing of the filming removal, which leading to prevent image deterioration and to provide stable images.

JP-A Nos. 2003-215982 and 10-91003 discloses optical detection of filming occurrence on electrophotographic photoconductors. However, electrophotographic photoconductors, in accordance with these proposals, suffer from a number of flaws due to scratch in use, which makes difficult to evaluate film occurrence because of the fluctuation of optical reflection conditions.

JP-A No. 07-55710 discloses a use of CCD cameras in which an optical reflection from photoconductor drums is introduced into the camera, flaws on the surface of the photoconductor drum, foreign matters mixed into photosensitive layers etc. are detected from the optical reflection. However, the difference between flaws and filmings are difficult to distinguish, since a number of flaws appear on the photoconductor surface due to scratch with the prolonged use.

As described above, it is difficult to evaluate and determine visually the filming occurrence in the prior art. Electrical or optical methods are also difficult to accurately determine the initial or slight filmings, as such, developments for evaluation methods are currently desired that can detect easily and accurately filmings even they are slight and/or partial.

On the other hand, electrophotographic photoconductors comprising a photosensitive layer on a support have been utilized widely for the electrophotographic photoconductors of electrophotographic image forming apparatuses such as copiers and printers. These electrophotographic photoconductors have also been utilized widely in process cartridges that further contain a developing device, cleaning device etc. within a case for easier exchangeability.

Recent years, various trials have been carried out with respect to recycle of electrophotographic photoconductors from the viewpoint of social needs i.e. resource saving and energy saving (see JP-A Nos. 09-211875, 2000-221704, 2003-98694, 08-6264, 11-095453 and 2005-221910).

In these proposals without exception, photosensitive layers are peeled away and raw aluminum pipes are re-coated with a photosensitive layer. However, there exist many sufficiently usable electrophotographic photoconductors among those collected from markets by virtue of recent improved quality of electrophotographic photoconductors; in such cases, it will be preferred from the viewpoint of resource and energy savings that the electrophotographic photoconductors are recycled without peeling the photosensitive layers.

JP-A No. 2005-266316 discloses that the percentage of usable organic photoconductor (OPC) drums is not lower among disposed or recycled OPC drums, provided that the thickness of photoconductor layers remains at a level of no less than one-fourth of the initial thickness even when some sort of degradation appears on certain properties; in particular, in cases where the OPC drums are utilized in digital image forming apparatuses such as laser printers and digital copiers, deterioration in electric properties in OPC drums is likely to be negligible since image-density change tends to be unnoticeable by virtue of image information from digital signals. It is also disclosed that OPC drums with abnormal image quality due to adhesion of foreign matters etc. can be reused after cleaning and removing the foreign matters.

As described above, in cases where electrophotographic photoconductors after use for image formation or electrophotographic photoconductors within process cartridges after use are to be reused, the electrophotographic photoconductors may be sufficiently usable provided that the photosensitive layers are less abraded and electrical property changes are slight.

However, all of these used electrophotographic photoconductors are not always reusable; for example, electrophotographic photoconductors having undergone troubles such as paper jams or filmings may be unusable in spite that the abrasion of photosensitive layers is little and the change of electrical properties is slight.

In addition, electrophotographic photoconductors having been used for image formation typically bear numerous fine flaws on the surfaces. These flaws often emerge and run in the circumferential direction; in cases where the flaws are shallow, the evaluation should be judged as pass since causing no problem on their reuse. On the other hand, filmings also often emerge in the circumferential direction like flaws, and the evaluation should be judged as rejection since such filmings typically influence the quality of images to non-negligible levels provided that the filmings exist slightly on the surfaces of electrophotographic photoconductors.

Accordingly, in cases where electrophotographic photoconductors are to be reused, examination and judgment are indispensable with respect to filming occurrence and reusability of the electrophotographic photoconductors. However, there exist fine flaws on the surfaces of electrophotographic photoconductors having been used for image formation, which making difficult to detect filmings efficiently.

As such, in order to determine the reusability of electrophotographic photoconductors within image forming apparatuses collected from markets, for example, various patterns of images may be formed using the image forming apparatuses collected from markets themselves. However, image forming apparatuses are typically utilized in various and inconsistent manner, thus the conditions thereof are often maintained improperly; for example, even when abnormal images generate for the collected image forming apparatuses with photoconductors as they are, the electrophotographic photoconductors may have no problem themselves.

Furthermore, in order to examine in such a manner, the electrophotographic photoconductors must be collected in their own image forming apparatuses therewith, which leading to a problem that those having larger volume and mass should be transported to sites for regenerating thereof.

In addition, outer packages of image forming apparatuses are typically of plastics, thus usually, iron materials are employed for their frames, and also printed wiring boards with electronics parts and laser sources etc. are mounted therein. In cases where these image forming apparatuses are collected from markets, they must be decomposed, and materials including plastics, iron, aluminum etc. must be distinguished at their regenerating sites. However, when image forming apparatuses are operated in a condition that electrophotographic photoconductors are mounted, there exists a problem that the decomposition and collection of each material must be carried out at the last stage.

In order to solve these problems, a method may be envisaged such that an image forming apparatus solely for the purpose of examination is provided, an electrophotographic photoconductor is mounted on the specific image forming apparatus for examination then examined through outputting images. However, this method takes a lot of troublesome task for the examination, since attachment and detachment to and from the specific image forming apparatus for examination are required for the respective examinations.

Moreover, process cartridges, in some cases, cannot be operated for example by reasons that (i) toner depletion from process cartridges, (ii) defects in cleaning blades, (iii) smear on charging rollers, (iv) filled waste toner tanks of cleaning units etc. although the electrophotographic photoconductors represent no significant problems such as abrasion, flaws, filmings etc. and are still usable themselves. These process cartridges in the cases of (i) to (iv) can be reused by way of removing the reasons to disturb their usage, such as operation to discard the waste toner from the waste toner tank, operation to exchange the cleaning blade, operation to refill the toner, operation to wipe the surface of the developing roll and operation to exchange the charging unit like a charging roll.

However, these process cartridges also require the evaluation as to the reusability of electrophotographic photoconductors since they cannot be used due to local flaws or filmings when such flaws or filmings are induced by troubles like paper Jam or filmings in use regardless of less abrasion in photosensitive layers.

As described above, the evaluation in terms of filming occurrence is essential in cases where electrophotographic photoconductors are reused; however, the determination as to the reusability is difficult since used electrophotographic photoconductors bear numerous fine flaws or streaks on the surfaces, therefore, the improvement or development are currently demanded still further with respect to the evaluation.

SUMMARY OF THE INVENTION

It is an object of the present invention is to provide a method for evaluating electrophotographic photoconductors that can easily and accurately evaluate initial filmings, slight filmings, or local filmings of 0.5 mm or less wide without being affected by surface conditions of electrophotographic photoconductors; it is another object of the present invention to provide a device for evaluating electrophotographic photoconductors.

It is another object of the present invention to provide a method for reusing electrophotographic photoconductors that can evaluate easily and accurately the reusability of used electrophotographic photoconductors, select usable electrophotographic photoconductors and reuse them efficiently, and thus contribute to resource and energy savings.

The present inventors have investigated vigorously in order to solve the problems described above and taken the following findings. That is, the electron transfer substances incorporated into the outermost layers, e.g. charge transfer layer, protective layer, photosensitive layer of monolayer type etc., of electrophotographic photoconductors are typically those that emit fluorescence upon being irradiated UV rays; the UV rays irradiated onto the electrophotographic photoconductors tend to be absorbed or decayed by filmings when being present on the surface of electrophotographic photoconductors. Then, the light intensity of UV rays also decreases that arrive to the charge transfer substances in the outermost layers; consequently, the fluorescence emitted from the electrophotographic photoconductors also decreases, which makes possible to confirm the filming occurrence by detecting the change of fluorescence. As such, it has been found that initial filmings or slight filmings, which being impossible to evaluate from the observation under visual lights such as of fluorescent tubes or incandescent lamps, can be figured out definitely.

In accordance with the inventive method for evaluating electrophotographic photoconductors, UV rays having a wavelength of 200 nm to 420 nm are irradiated onto an electrophotographic photoconductor, and filming occurrence is evaluated by measuring the fluorescence emitted from the electrophotographic photoconductor.

The inventive method for evaluating electrophotographic photoconductors comprises irradiating UV rays having a wavelength of 200 nm to 420 nm onto an electrophotographic photoconductor, and observing filmings on the surface of the electrophotographic photoconductor, therefore, the filmings can be clearly observed even when the filmings are slight and hardly noticeable, and the evaluation can be achieved without being affected by flaws etc. on the surface of the electrophotographic photoconductor.

The inventive device for evaluating electrophotographic photoconductors, which is a device for evaluating filming occurrence on electrophotographic photoconductors, comprises an irradiating unit configured to irradiate UV rays having a wavelength of 200 nm to 420 nm onto the electrophotographic photoconductor, and a measuring unit configured to measure fluorescence irradiated from the electrophotographic photoconductor.

The inventive device for evaluating electrophotographic photoconductors comprises irradiating UV rays having a wavelength of 200 nm to 420 nm onto an electrophotographic photoconductor, and observing filmings on the surface of the electrophotographic photoconductor, therefore, the filmings can be clearly observed even when the filmings are slight and hardly noticeable, and the evaluation can be achieved without being affected by flaws etc. on the surface of the electrophotographic photoconductor.

The inventive method for reusing electrophotographic photoconductors comprises evaluating reusability of used electrophotographic photoconductors, then selecting and reusing usable electrophotographic photoconductors, in which the evaluation on the reusability of the electrophotographic photoconductors is carried out by the inventive method for evaluating the electrophotographic photoconductors described above.

In accordance with the inventive method for reusing electrophotographic photoconductors, UV rays having a wavelength of 200 nm to 420 nm are irradiated and then the fluorescence emitted from the electrophotographic photoconductors is measured, therefore, the evaluation on the reusability can be clearly carried out with higher accuracy and the usable electrophotographic photoconductors can be selected even when there exist flaws or streaks induced during image formation on the surfaces of the used electrophotographic photoconductors and thus filmings are hardly noticeable due to intermixing of the filmings with the streaks.

The inventive process cartridge comprises the electrophotographic photoconductor that is evaluated to be usable by the inventive method for reusing electrophotographic photoconductors; and at least one selected from the group consisting of a charging unit configured to charge the electrophotographic photoconductor, a developing unit configured to develop an electrostatic latent image using a toner for visualizing the electrostatic latent image, a transferring unit configured to transfer the toner image to a recording medium, and a cleaning unit configured to clean the toner remained on the photoconductor, and is detachable to bodies of image forming apparatuses.

The image forming method according to the present invention comprises at least forming an electrostatic latent image on the electrophotographic photoconductor that is evaluated to be available by the inventive method for reusing electrophotographic photoconductors; developing the electrostatic latent image using a toner to form a visible image; transferring the visible image onto a recording medium; and fixing the transferred visible image on the recording medium.

The image forming apparatus according comprises the electrophotographic photoconductor that is evaluated to be available by the inventive method for reusing electrophotographic photoconductors, an electrostatic latent image forming unit configured to form an electrostatic latent image on the electrophotographic photoconductor, a developing unit configured to develop the electrostatic latent image using a toner to form a visual image, a transferring unit configured to transfer the toner image to a recording medium, and a fixing unit configured to fix the transferred image on the recording medium.

DESCRIPTION OF THE PREFERRED EMBODIMENTS

Figure 1A:
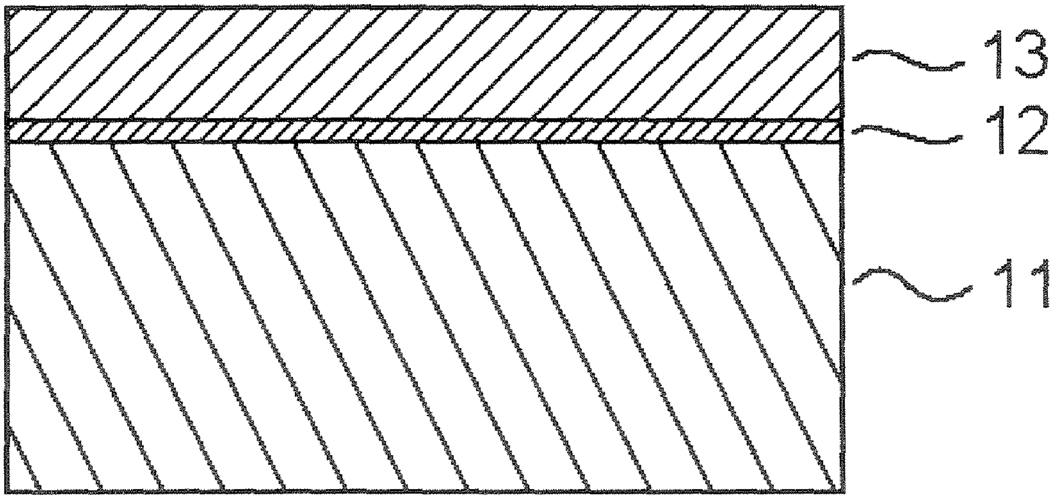
FIG. 1A is a schematic cross-section that shows an example of layer construction of an electrophotographic photoconductor.

Method For Evaluating Electrophotographic Photoconductor And Device For Evaluating Electrophotographic Photoconductor In accordance with the method for electrophotographic photoconductor, UV rays having a wavelength of 200 nm to 420 nm are irradiated onto an electrophotographic photoconductor, and the fluorescence emitted from the electrophotographic photoconductor is determined, thereby filming occurrence is evaluated.

The inventive device for evaluating electrophotographic photoconductors comprises an irradiation unit configured to irradiate UV rays having a wavelength of 200 nm to 420 nm onto the electrophotographic photoconductor, a measuring unit configured to measure fluorescence emitted from the electrophotographic photoconductor, and optional other units as required.

The working of the inventive device for evaluating electrophotographic photoconductors should result in the working of the inventive method for evaluating electrophotographic photoconductors.

The inventive method for evaluating electrophotographic photoconductors will be explained in the following, which will also make clear the inventive device for evaluating electrophotographic photoconductors in detail.

UV Ray Irradiation (UV Ray Irradiation Unit)

The wavelength of UV rays irradiated onto the surface of the electrophotographic photoconductors is 200 nm to 420 nm, preferably 240 nm to 410 nm, more preferably 240 nm to 270 nm. The wavelength shorter than 200 nm may lead to large-scale measuring devices since the wavelength shorter than 200 nm is within so-called vacuum UV region which represents an intense absorption of oxygen, therefore the optical path must be evacuated or nitrogen-purged before the measurements. On the other hand, the wavelength longer than 420 nm may result in inaccurate detection of filmings due to non-emission or little fluorescence if any from electrophotographic photoconductors.

The illumination intensity of UV rays is preferably 100 $\mu W/cm^2$ to 1000 $\mu W/cm^2$ on the surface of electrophotographic photoconductors, more preferably 200 $\mu W/cm^2$ to 700 $\mu W/cm^2$.

The illumination intensity of UV rays less than 100 $\mu W/cm^2$ may result in inaccurate detection of filmings due to less fluorescence derived from less optical amount of UV rays onto electrophotographic photoconductors; meanwhile, the illumination intensity of UV rays more than 1000 $\mu W/cm^2$ may induce optical fatigue due to excessive amounts of UV rays irradiated onto the electrophotographic photoconductors.

The irradiation period of UV rays having a wavelength of 200 nm to 420 nm onto the electrophotographic photoconductors is preferably no longer than one minute per irradiation at one time, more preferably no longer than 30 seconds, still more preferably no longer than 5 seconds. The irradiation period of longer than one minute per irradiation at one time may induce optical fatigue of the electrophotographic photoconductors due to excessive amounts of UV rays irradiated onto the electrophotographic photoconductors.

The optical source of UV rays may be properly selected depending on the application; examples thereof include UV ray lamps, UV LEDs, mercury lamps, mercury xenon lamps and high-pressure mercury lamps. Among these, UV ray lamps and UV LEDs are preferable in particular The UV ray lamps are favorably exemplified by those for thin-film chromatography such as UV lamps by Topcon Co. including model PU-2 (emission wavelength: 250 to 400 nm), model FI-5L (emission wavelength: 300 to 400 nm) and model FI-5S (emission wavelength: about 254 nm).

Examples of the UV LEDs include OSSV5111A (by Opto-Supply Co., peak emission wavelength: about 400 nm), SDL-5N3CUV-A (by Sander Electronics Co. in German, peak emission wavelength: about 400 nm), and surface-mount UV LED SECULVOAC (by Sanken Electric Co., peak emission wavelength: about 385 nm).

Method For Measuring Fluorescence From Electrophotographic Photoconductor (Measuring Unit)

The method for measuring the fluorescence emitted from the electrophotographic photoconductors may be properly selected depending on the application; for example, the method may be on the basis of (i) visual observation, (ii) observation of images formed by an image receiving unit (including images after image processing), or (iii) detection by means of a light-sensitive element sensitive to the fluorescence wavelength.

The image receiving unit of (ii) described above may be properly selected depending on the application; various cameras may be utilized for the unit, more specifically, in addition to conventional silver salt cameras, digital cameras may be employed that are equipped with CCDs or C-MOSs as the imaging devices, alternatively two-dimensional line sensors may be employed.

The images obtained by the image receiving unit may be visually observed in terms of density change without modification, alternatively may be displayed digitally through distinguishing stepwise the change of image density by image processing, thereby filming occurrence can be discriminated clearly. The image processing may be on the basis of contrast increase, edge enhancement and arithmetic processing such as Fourier transform.

The light-sensitive element of (iii) described above may be properly selected depending on the application as long as being sensitive to the fluorescence wavelength emitted from the electrophotographic photoconductors; examples thereof include photodiodes, phototransistors, CCD sensors and C-MOS sensors.

In addition, the fluorescence emitted from the electrophotographic photoconductors can be photographed by use of light-receiving elements such as one-dimensional CCDs and two-dimensional CCDs, then being processed to contrast increase, edge enhancement and arithmetic processing such as Fourier transform.

The peak wavelength of spectral sensitivity of the light-receiving elements is preferably 450 nm to 700 nm, more preferably 500 nm to 600 nm, since the fluorescence wavelength emitted from electron transport substances in the electrophotographic photoconductors after receiving UV rays is typically in the range of 450 nm to 700 nm.

It may be also effective to provide an optical filter over the surface of the light-receiving elements in order to absorb or cut the UV rays. In such cases, such optical filters are preferably employed that exhibit 440 nm to 580 nm of transmission threshold wavelength that is defined in “Photographic Glass Filter (sharp cut)” of JIS B7133.

The term “transmission threshold wavelength” refers to the wavelength at the center of wavelength slope width, where the wavelength slope width refers to the span between the wavelength at which the transmissivity comes to 72% or more and the wavelength at which the transmissivity comes to 5% or less with respect to spectral transmissivity of the filter.

When the optical filter having a transmission threshold wavelength of 440 nm to 580 nm defined in “Photographic Glass Filter (sharp cut)” of JIS B7133 is disposed over the light-receiving face of the light-receiving element, the UV rays from the optical source can be interrupted to enter into the light-receiving element and the fluorescence can enter exclusively.

The material of the optical filter may be selected from various materials including glasses and plastics. Among the commercially available photographic filters, gelatin filters and triacetyl cellulose filters are also appropriately usable.

The method to measure the fluorescence emitted from the electrophotographic photoconductors can be carried out, specifically, by rotating an electrophotographic photoconductor to be measured at a constant rate, irradiating UV rays onto it, detecting the fluorescence by a light-receiving element, and arithmetic-processing the signal without or with amplification so as to suppress the fluorescence fluctuation. The light-receiving element may be, for example, Si photodiodes, Si phototransistors or the like, more specifically, Si photodiode S7686 (by Hamamatsu Photonics K.K.) etc. can be adequately employed. Various methods are available to arithmetically process the signals; for example, analog comparators can be utilized in cases of analog signals; the detected signals can be subjected to A/D conversion and digital processing so as to suppress the fluorescence fluctuation.

When the device for evaluating electrophotographic photoconductors is set at dark rooms or places surrounded by blackout curtains so as to interrupt environmental lights, the fluorescence emitted from electrophotographic photoconductors can be definitely detected.

In cases where the electrophotographic photoconductor is of drum-shape, the evaluation is preferably carried out by irradiating UV rays while rotating the drum-shape electrophotographic photoconductor in a certain direction.

In cases where the electrophotographic photoconductor is of belt-shape, the evaluation is preferably carried out by irradiating UV rays while moving the belt-shape electrophotographic photoconductor in a certain direction.

It is preferred in view of convenience that the evaluation is carried out in a condition that the electrophotographic photoconductors are installed within process cartridges.

The other units described above are exemplified by a control unit. The control unit may control the respective steps. The control unit may be properly selected depending on the application; examples thereof include instruments such as sequencers and computers.

Electrophotographic Photoconductor

The electrophotographic photoconductors in the present invention may be properly selected depending on the application, as long as the outermost layer contains a charge transport substance in an amount of 30% by mass or more that emits fluorescence upon being irradiated UV rays. The electrophotographic photoconductor has at least a photosensitive layer on a support, the photosensitive layer may be of monolayer structure or laminate structure, preferably of function-separated laminate structure.

In cases of monolayer structure, the outermost layer is preferably a protective layer or a photosensitive layer of monolayer structure; in cases of laminate structure, the outermost layer is preferably a charge transport layer or a protective layer. The content of the charge transport substance, which emits fluorescence upon being irradiated UV rays, is preferably no less than 30% by mass in the outermost layer, more preferably 40 to 60% by mass. The electrophotographic photoconductor thereby emits fluorescence upon being irradiated UV rays, which allowing to observe filmings that absorb or decay the UV rays.

When the content of the charge transport substance is less than 30% by mass, the electrophotographic photoconductors tend to emit no clear fluorescence upon irradiation of UV rays, thus the evaluation of filmings may be difficult, when more than 60% by mass, the hardness of the outermost layer is likely to be lower and the wear resistance may be insufficient regardless of sufficient fluorescence.

The charge transport substances may be properly selected depending on the application as long as capable of emitting fluorescence upon UV ray irradiation; the charge transport substances, being preferably low-molecular weight substances, are typically classified into electron transport substances and positive hole transport substances.

Examples of the electron transport substances include chloranil, bromanil, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno[1,2-b]thiophene-4-one, 1,3,7-trinitrodibenzothiophene-5,5-dioxide, and benzoquinone derivatives. These may be used alone or in combination.

Examples of the positive hole transport substances include poly-N-vinylcarbazole and its derivatives, poly-γ-carbazolylethylglutamate and its derivatives, 20 pyrene-formaldehyde condensates and their derivatives, polyvinylpyrene, polyvinylphenanthrene, polysilane, oxazole derivatives, oxadiazole derivatives, imidazole derivatives, monoarylamine derivatives, diarylamine derivative, triarylamine derivatives, stilbene derivative, α-phenylstilbene derivatives, benzidine derivative, diarylmethane derivatives, triarylmethane derivatives, 9-styrylanthracene derivatives, pyrazoline derivatives, divinylbenzene derivatives, hydrazine derivatives, indene derivatives, butadiene derivatives, pyrene derivatives, bisstilbene derivatives, enamine derivatives, thiazole derivatives, triazole derivatives, phenazine derivatives, acridine derivatives, benzofuran derivatives, benzimidazole derivatives and thiophene derivatives. These may be used alone or in combination.

FIGS. 1A, 1B, 1C and 1D are each a schematic cross-section of a laminated electrophotographic photoconductor available in the present invention.

FIG. 1A shows an electrophotographic photoconductor is having such a structure that a charge generating layer 12 consisting primarily of a charge generating substance and a charge transport layer 13 consisting primarily of a charge transport substance are laminated in order on a support 11.

Figure 1B:
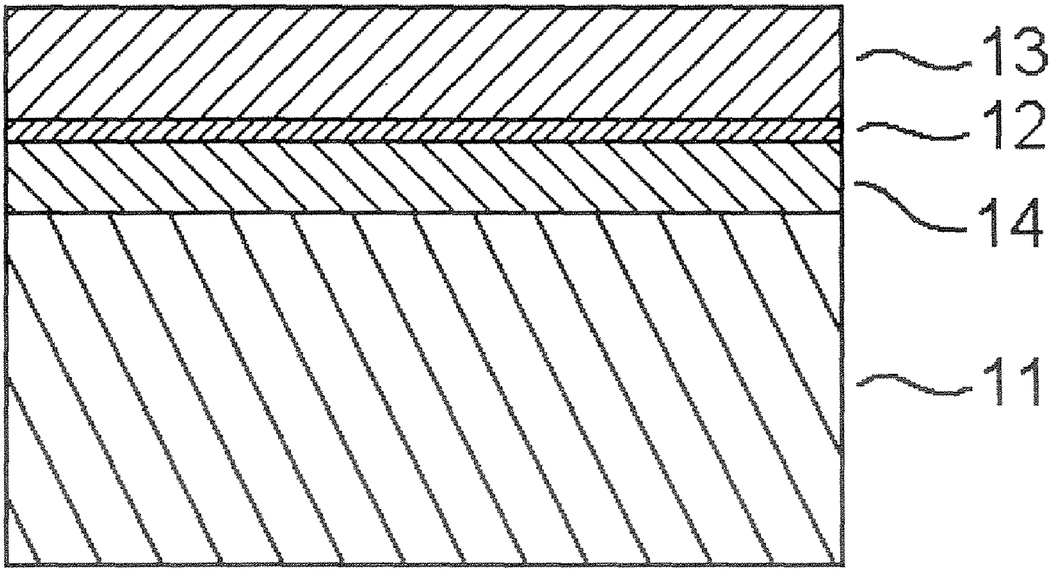
FIG. 1B is a schematic cross-section that shows another example of layer construction of an electrophotographic photoconductor.

FIG. 1B shows an electrophotographic photoconductor having such a structure that an undercoat layer 14 is formed on a support 11, a charge generating layer 12 consisting primarily of a charge generating substance and a charge transport layer 13 consisting primarily of a charge transport substance are laminated in order on the undercoat layer.

Figure 1C:
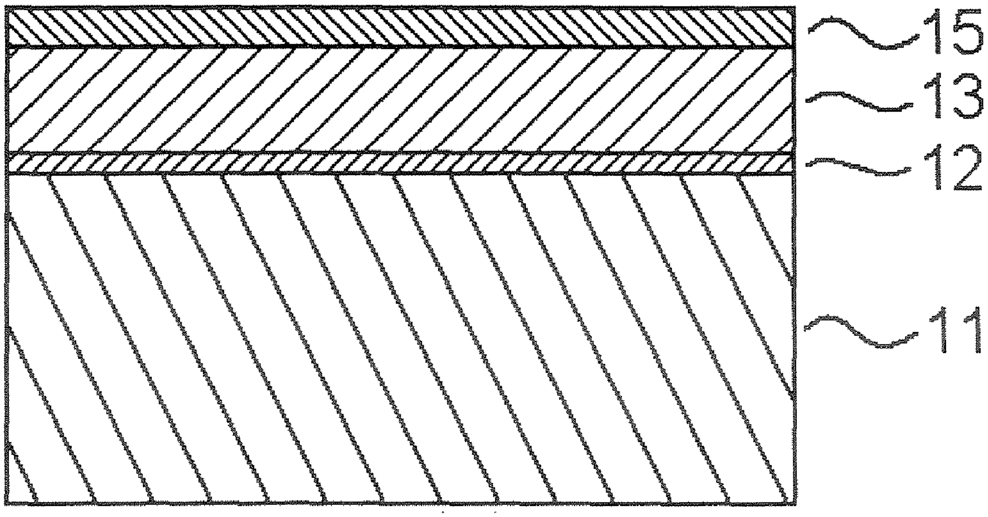
FIG. 1C is a schematic cross-section that shows still another example of layer construction of an electrophotographic photoconductor.

FIG. 1C shows an electrophotographic photoconductor having such a structure that a charge generating layer 12 consisting primarily of a charge generating substance, a charge transport layer 13 consisting primarily of a charge transport substance and a protective layer 15 are laminated in order on a support 11.

Figure 1D:
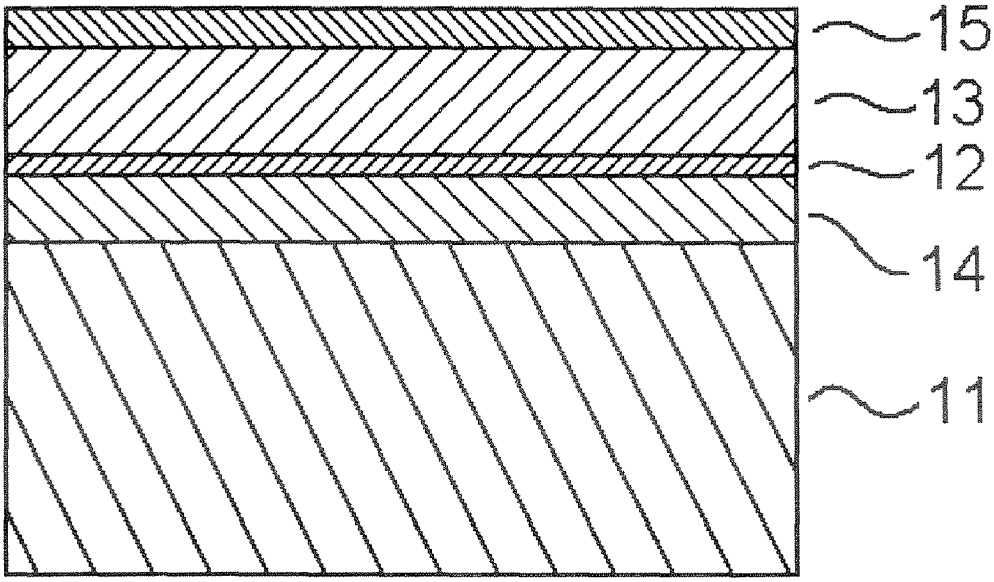
FIG. 1D is a schematic cross-section that shows still another example of layer construction of an electrophotographic photoconductor.

FIG. 1D shows an electrophotographic photoconductor having such a structure that an undercoat layer 14 is formed on a support 11, a charge generating layer 12 consisting primarily of a charge generating substance, a charge transport layer 13 consisting primarily of a charge transport substance and a protective layer 15 are laminated in order on the undercoat layer.

Support

The support may be properly selected depending on the application as long as having a conductivity of $10^{10}\Omega\cdot$cm or less in terms of the volume resistance; examples thereof include (i) film-like or cylindrical plastics or papers coated with metal such as aluminum, nickel, chromium, nichrome, copper, gold, silver and platinum or with metal oxide such as tin oxide and indium oxide by way of vapor-deposition or sputtering; (ii) pipes surface-processed by cutting, super-finishing or polishing, after preparing raw pipes by extrusion or drawing plates or pipes of aluminum, aluminum alloy, nickel or stainless steel; (iii) an endless nickel belt or endless stainless steel belt disclosed in JP-A No. 52-36016; and (iv) nickel foil of 50 μm to 150 μm thick or polyethylene terephthalate film of 50 μm to 150 μm thick with conductive processing such as aluminum deposition.

The supports described above, coated with a fluid containing a conductive powder, binder resin and solvent, may also be utilized as the support in the present invention. Examples of the conductive powder include carbon black, acetylene black; metal powders such as of aluminum, nickel, iron, nichrome, copper, zinc and silver; and metal oxides such as conductive tin oxide and ITO.

Examples of the binder resin polystyrene resins, styrene-acrylonitrile copolymers, styrene-butadiene copolymers, styrene-maleic anhydride copolymers, polyester resins, polyvinyl chloride resins, vinyl chloride-vinyl acetate copolymers, polyvinyl acetate resins, polyvinylidene chloride resins, polyacrylate resins, phenoxy resins, polycarbonate resins, cellulose acetate resins, ethylcellulose resins, polyvinyl butyral resins, polyvinyl formal resins, polyvinyl toluene resins, poly-N-vinylcarbazole resins, acrylic resins, silicone resins, epoxy resins, melamine resins, urethane resins, phenolic resins and alkyd resins.

Examples of the solvent include tetrahydrofuran, dichloromethane, methyl ethyl ketone and toluene.

Further, such materials may also available as the support that conductive layers of heat-shrinkable tube, containing the conductive powders described above into materials e.g. polyvinyl chloride resins, polypropylene resins, polyester resins, polystyrene resins, polyvinylidene chloride resins, polyethylene resins, chloride rubbers and Teflon (registered trade mark), are disposed on cylindrical base materials.

Laminated Photosensitive Layer

The laminated photosensitive layer comprises at least a charge generating layer and a charge transport layer in this order, and optionally a protective layer, intermediate layer and other layers as required.

Charge Generating Layer

The charge generating layer comprises at least a charge generating substance, and optionally a binder resin and other ingredients.

The charge generating substance may be properly selected depending on the application; inorganic materials as well as organic materials are employable.

The inorganic materials may be selected properly without limitation; examples thereof include crystalline selenium, amorphous selenium, selenium-tellurium, selenium-tellurium-halogen and selenium-arsenic compound.

The organic materials may be selected properly without limitation from conventional materials; examples thereof include CI Pigment Blue 25 (color index C.I.21180), CI Pigment Red 41 (color index C.I.21200), CI Pigment Blue 52 (color index C.I.45100), CI Basic Red 3 (C.I.45210); azo pigments having a carbazole skeleton, azo pigments having a distyrylbenzene skeleton, azo pigments having a triphenylamine skeleton, azo pigments having a dibenzothiophene skeleton, azo pigments having an oxadiazole skeleton, azo pigments having a fluorenone skeleton, azo pigments having a bis-stilbene skeleton, azo pigments having a distyryloxadiazole skeleton, azo pigments having a distyrylcarbazole skeleton; phthalocyanine pigments such as CI Pigment Blue 16 (C.I.74100); indigo pigments such as CI Bat Brown (C.I.73410), CI Bat Dye (C.I.730.50); and perylene pigments such as Algo-Scarlet B (by Bayer Co.). These may be used alone or in combination.

Among these, phthalocyanine pigments are preferable, more preferable are titanylphthalocyanine, particularly preferable as a high-sensitive material is titanylphthalocyanine having a maximum diffraction peak of Bragg angle 2θ at 27.2±0.2° in terms of CuKα X ray (wavelength: 1.541 Å).

The binder resin may be properly selected depending on the application; examples thereof include polyamide resins, polyurethane resins, epoxy resins, polyketone resins, polycarbonate resins, silicone resins, acrylic resins, polyvinylbutylal resins, polyvinylformal resins, polyvinyl ketone resins, polystyrene resins, poly-N-vinylcarbazol resins and polyacrylamide resins. These binder resins may be used alone or in combination.

A charge transport substance may be added to the charge generating layer. Furthermore, a polymer of charge transport substances may be added as the binder resin of the charge generating layer in addition to the binder resins described above.

The methods for forming the charge generating layer include vacuum thin-film forming methods and casting methods from solution dispersion systems.

Examples of the vacuum thin-film forming methods include glow discharge polymerization method, vacuum deposition method, CVD method, sputtering method, reactive sputtering method, ion plating method and accelerated ion injection method. The inorganic materials or organic materials described above may be employed appropriately in the vacuum thin-film forming methods.

When the charge generating layer is disposed by the casting method, conventional methods such as dip-coating method, spray coating method and bead coating method may be utilized through coating a liquid for charge generating layer.

Examples of the organic solvents for the coating liquids of charge generating layers include acetone, methyl ethyl ketone, methyl isopropyl ketone, cyclohexanone, benzene, toluene, xylene, chloroform, dichloromethane, dichloroethane, dichloropropane, trichloroethane, trichloroethylene, tetrachloroethane, tetrahydrofran, dioxolan, dioxane, methanol, ethanol, isopropyl alcohol, butanol, ethyl acetate, butyl acetate, dimethylsulfoxide, methyl cellosolve, ethyl cellosolve and propyl cellosolve. These may be used alone or in combination.

Among these organic solvents, tetrahydrofran, methyl ethyl ketone, dichloromethane, methanol and ethanol having a boiling point of 40° C. to 80° C. are particularly preferable due to east drying after the coating.

The coating liquid for charge generating layers is prepared by dispersing and/or dissolving the charge generating material and binder resin in the above organic solvent. Examples of the methods for dispersing organic pigments in the organic solvents include dispersing method using dispersal media such as ball mill, bead mill, sand mill, vibration mill etc., or high-speed fluid collision dispersing method.

The thickness of the charge generating may be properly selected depending on the application; preferably, the thickness is 0.01 μm to 5 μm, more preferably 0.05 μm to 2 μm.

Charge Transport Layer

The charge transport layer is purposed to maintain a static charge and to unite it with another static charge generated and separated from the charge generating layer by UV exposure. In order to maintain a static charge, the charge transport layer is needed to have high electrical resistance. Moreover, in order to obtain high surface potential with the maintained charge, the charge transport layer is needed to have low dielectric constant and appropriate charge transferring ability.

The charge transport layer contains at least a charge transport material and a binder resin, and optionally other ingredients.

The charge transport substances of lower-molecular weights may be utilized for the charge transport substance such as positive-hole transport substances and electron transport substances; and charge transport substances of higher-molecular weights may be included as required. In cases where the charge transport layer is the outermost layer, the charge transport substances of lower-molecular weights such as positive-hole transport substances and electron transport substances may be similar as those of the outermost layer.

The charge transport substances having higher molecular weights are exemplified by those having structures described below.

(a) Examples of polymers having a carbazole ring include polyvinyl-N-carbazole, and compounds described in Japanese Patent Application Laid-Open (JP-A) Nos. 50-82056, 54-9632, 54-11737, 04-175337, 04-183719, and 06-234841.

(b) Examples of polymers having a hydrazone structure include compounds described in JP-A Nos. 57-78402, 61-20953, 61-296358, 01-134456, 01-179164, 03-180851, 03-180852, 03-005055, 05-310904, and 06-234840.

(c) Examples of polysilylene polymers include compounds described in JP-A Nos. 63-285552, 01-88461, 04-264130, 04-264131, 04-264132, 04-264133, and 04-289867.

(d) Examples of polymers having a triarylamine structure include N,N-bis-(4-methylphenyl)-4-aminopolystylene, and compounds described in JP-A Nos. 01-134457, 02-282264, 02-304456, 04-133065, 04-133066, 05-040350, and 05-202135.

(e) Examples of other polymers include formaldehyde polycondensation products of nitropyrene, and compounds described in JP-A Nos. 51-73888, 56-150749, 06-234836, and 06-234837.

In addition to those described above, examples of charge transport substances having higher molecular weights include polycarbonates, polyurethanes, polyesters, and polyesters all of which having a triarylamine structure, more specifically, those described in JP-A Nos. 64-001728, 64-013061, 64-019049, 04-11627, 04-225014, 04-230767, 04-320420, 05-232727, 07-56374, 09-127713, 09-211877, and 09-304956.

The binder resin may be properly selected depending on the application; examples thereof include polycarbonate resins, polyester resins, methacrylic resins, acryl resins, polyethylene resins, polyvinylchloride resins, polyvinylacetate resins, polystyrene resins, phenol resins, epoxy resins, polyurethane resins, polyvinylidene chloride resins, alkyd resins, silicone resins, polyvinyl carbazole resins, polyvinyl butyral resins, polyvinyl formal resins, polyacrylate resins, polyacrylamide resins, and phenoxy resins. These resins may be used alone or in combination.

The charge transport layer may contain a copolymer between a crosslinkable binder resin and a crosslinkable charge transport substance.

The content of the charge transport substance is preferably 30% by mass or more in the charge transport layer, more preferably 40% by mass or more. When the content is less than 30% by mass, the damping time may be insufficient under pulse irradiation for laser-writing onto photoconductors in high-speed electrophotographic processes.

The charge transport layer may be produced by dissolving or dispersing these charge transport substances and binder resins into an adequate solvent, then coating and drying the liquid. The charge transport layer may be added, in addition to the electric charge transporting substances and the binder resins, an appropriate amount of additives such as plasticizers, antioxidants and leveling agents as required.

The thickness of the charge transport layer may be properly selected depending on the application; preferably, the thickness is 5 μm to 30 μm.

Monolayer Photosensitive Layer

The monolayer photosensitive layer comprises a charge generating substance, charge transport substance, and binder resin, and also the other ingredients as required.

The charge generating substance, charge transport substance, and binder resin may be substantially the same as those of the laminated photosensitive layer described above. The other ingredients may be plasticizers, fine particles, various additives etc. In cases where the monolayer photosensitive layer is the outermost layer, the charge transport substances of lower-molecular weights such as positive-hole transport substances and electron transport substances may be similar as those of the outermost layer.

The thickness of the monolayer photosensitive layer may be properly selected depending on the application; preferably, the thickness is 5 μm to 100 μm, more preferably 5 μm to 50 μm. When the thickness is less than 5 μm, the charging ability may be low, when more than 100 μm, the sensitivity may be poor.

Protective Layer

As to the construction of the electrophotographic photoconductors, a protective layer may be formed as the outermost layer on the photosensitive layer in order to protect the photosensitive layer and to increase the durability. It is significantly effective to include charge transport substances having lower molecular weights that can emit fluorescence upon UV ray irradiation onto the outermost layer; its content is preferably 30% by mass or more, more preferably 40% by mass or more, which resulting in improvement in optical properties.

The protective layer contains a binder resin and a filler, and also other ingredients as required.

The binder resin may be properly selected depending on the application; examples thereof include ABS resins, ACS resins, copolymers of olefin-vinyl monomers, chlorinated polyether resins, allyl resins, phenol resins, polyacetal resins, polyamide resins, polyamideimide resins, polyacrylate resins, polyarylsulfone resins, polybutylen resins, polybutylene terephthalate resins, polycarbonate resins, polyether sulfone resins, polyethylene resins, polyethylene terephthalate resins, polyimide resins, acrylic resins, polymethylpentene resins, polypropylene resins, polyphenylene oxide resins, polysulfone resins, AS resins, ABS resins, polyurethane resins, polyvinyl chloride resins, polyvinylidene chloride resins and epoxy resins.

In order to improve the wear resistance of the protective layer, fillers may be effectively added to the protective layer. The filler are exemplified by fine particles of organic materials such as fluorine resins like polytetrafluoroethylene and silicone resins; and inorganic materials such as titanium oxide, silica, alumina, zirconium oxide, tin oxide, indium oxide and potassium titanate.

The content of the filler is preferably 10% by mass to 40% by mass in the protective layer, more preferably 20% by mass to 30% by mass. When the filler content is less than 10% by mass, the abrasion may be significant and the durability may be poor, on the other hand, when the filler content is more than 40% by mass, the sensitivity disadvantageously is likely to drop due to significant rise in the potential of light parts upon irradiation. The primary particle size of the filler is preferably 0.3 μm to 1.2 μm in the average, more preferably 0.3 μm to 0.7 μm. When the particle size is less than 0.3 μm, the abrasion resistance may be insufficient, and when above 1.2 μm, the writing light may be scattered.

A dispersion auxiliary may be added to the protective layer in order to improve the dispensability of the filler. Examples of the dispersion auxiliary include modified epoxy resin condensates, unsaturated carboxylic acid polymers with lower molecular weights etc.; the content is preferably 0.5 to 4% by mass based on the filler mass, more preferably 1 to 2% by mass.

The process for forming the protective layer may be properly selected depending on the application; for example, spray coating processes, ring coating processes etc. may be employed. The thickness of the protective layer is preferably 0.1 μm to 10 μm, more preferably 4 μm to 6 μm.

Undercoat Layer

Optionally, an undercoat layer may be provided between the support and the photosensitive layer. The undercoat layer is provided in order to improve adhesion, to prevent Moire patterns, to improve coating ability with the upper layer and to reduce residual potential.

The undercoat layer comprises a resin, a pigment, and other optional ingredients as required.

Examples of the resin include water-soluble resins such as polyvinyl alcohol, casein, sodium polyacrylate; alcohol-soluble resins such as copolymer nylon and methoxymethylated nylon; and thermosetting resins which form a three-dimensional network such as polyurethane resins, melamine resins, phenol resins, alkyd-melamine resins, and epoxy resins.

The pigment may be properly selected depending on the application; examples thereof include metal oxides such as titanium oxide, silica, alumina, zirconium oxide, tin oxide and indium oxide; metal sulfides and metal nitrides.

The thickness of the undercoat layer may be properly selected depending on the application; preferably the thickness is 0.1 μm to 10 μm, more preferably 1 μm to 5 μm.

Optionally, an intermediate layer may be provided on the support of the photoconductor as required in order to improve the adhesion or charge blocking ability. The intermediate layer is typically based on a resin, which is preferably highly organic solvent-resistant from the viewpoint that a photosensitive layer is coated on the resin using a solvent. The resin may be properly selected from those of the undercoat layer.

In the electrophotographic photoconductors, an intermediate layer may optionally be formed between the photosensitive layer and the protective layer. The intermediate layer typically contains a binder resin as the main component. The binder resin may be exemplified by polyamide resins, alcohol-soluble nylon, water-soluble polyvinyl butylal resins, polyvinyl butylal resins and polyvinyl alcohol resins. The intermediate layer may be formed by a process selected from conventional coating processes. The thickness of the intermediate layer is preferably 0.05 μm to 2 μm.

In the inventive electrophotographic photoconductors, an antioxidant may be included into the respective layers of the monolayer photosensitive layer, charge generating layer, charge transport layer, undercoat layer, protective layer etc. in order to improve the environment resistance, in particular to prevent the decrease of sensitivity and the increase of residual potential.

The antioxidant is exemplified by phenol compounds, paraphenylene diamines, hydroquinones, organic sulfur compounds and organic phosphoric compounds.

Examples of the phenol compounds include 2,6-di-t-butyl-p-cresol, butylhydroxyanisole, 2,6-di-t-butyl-4-ethylphenol, stearyl-β-(3,5-di-t-butyl-4-hydroxyphenyl)propionate, 2,2'-methylene-bis-(4-methyl-6-t-butylphenol), 2,2'-methylene-bis-(4-ethyl-6-t-butylphenol), 4,4'-thiobis-(3-methyl-6-t)-butylphenol, 4,4'-butylydenebis-(3-methyl-6-t-butylphenol), 1,1,3-tris-(2-methyl-4-hydroxy 5-t-butylphenyl)butane, 1,3,5-trimethyl-2,4,6-tris-(3,5-di-t-butyl-4-hydroxybenzyl)benzene, tetrakis-[methylene 3-(3',5'-di-t-butyl-4'-hydroxy-phenyl)propionate]methane, bis-[3,3'-bis-(4'-hydroxy-3'-t-butylphenyl)butylic acid]glycolester, tocopherols, etc.

Examples of the paraphenylene diamines compound include N-phenyl-N'-isopropyl-p-phenylene diamine, N,N'-di-sec-butyl-p-phenylene diamine, N-phenyl-N-sec-butyl-p-phenylene diamine, N,N'-di-isopropyl-p-phenylene diamine, N,N'-dimethyl-N,N'-di-t-butyl-p-phenylene diamine, etc.

Examples of the hydroquinones include 2,5-di-t-octyl hydroquinone, 2,6-di-dodecyl hydroquinone, 2-dodecyl hydroquinone, 2-dodecyl 5-chlorohydroquinone, 2-t-octyl 5-methyl hydroquinone, 2-(2-octadecenyl)-5-methyl hydroquinone, etc.

Examples of the organic sulfur compound include dilauril-3,3'-thiodipropionate, distearil-3,3'-thiodipropionate, ditetradecyl-3,3'-thiodipropionate.

Examples of the organic phosphoric compound include triphenyl phosphine, tri(nonylphenyl)phosphine, tri(di-nonyl phenyl) phosphine, tri-cresil phosphine, tri(2,4-dibutyl phenoxy)phosphine, etc.

These compounds are conventional as the antioxidants of rubbers, plastics, fat and oils, and are commercially available. The content of the antioxidant is preferably 0.01% by mass to 10% by mass based on the total mass of the layer to be incorporated.

In accordance with the present invention, even initial filmings or slight filmings can be detected correctly on the basis of the phenomena such as the charge transport substance within the monolayer-structure photosensitive layer, charge transport layer, or protective layer emits fluorescence upon being irradiated UV rays.

The substances that emit fluorescence upon being irradiated UV rays may be coated on the surface of electrophotographic photoconductors. That is, when a filming generate on the surface of electrophotographic photoconductors, the light irradiated to the electrophotographic photoconductors is absorbed or interrupted to decay by the filming portions generated on the surface of electrophotographic photoconductors, the light amount that leaches to the monolayer-structure photosensitive layer, charge transport layer, or protective layer decreases only at the filming portions, consequently, the fluorescence emitted from the electrophotographic photoconductors decreases.

Figure 2A:
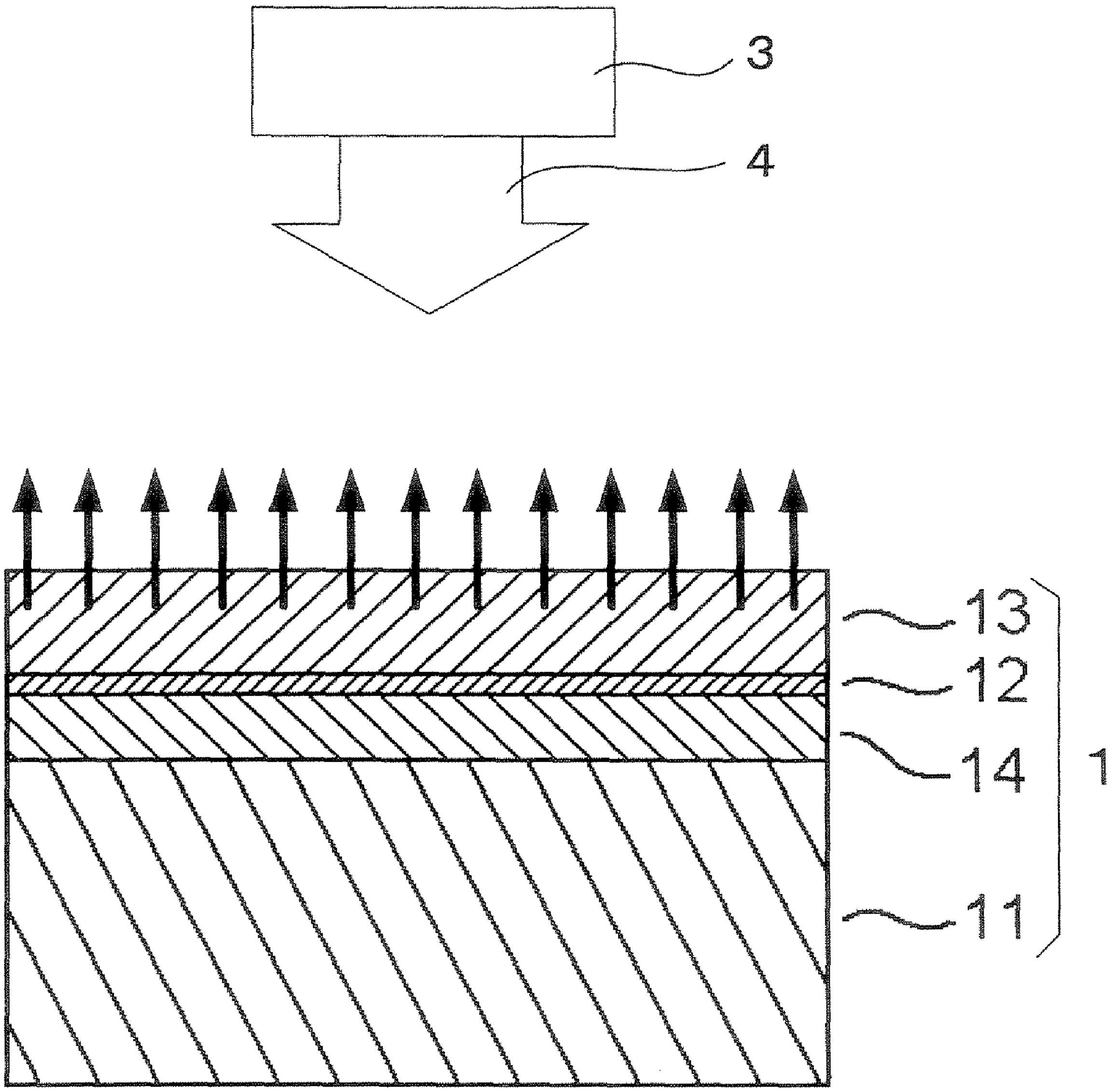
FIG. 2A is an illustrative view that shows a condition in which no filming exist on a surface of an electrophotographic photoconductor.

FIG. 2A is a conceptual view where no filming exists on the surface of electrophotographic photoconductor 1.

The light 4 irradiated from optical source 3 reaches the surface of electrophotographic photoconductor 1 since no fouling or deposit exists on the surface that absorbs or interrupts the light, and fluorescence is emitted from the surface of electrophotographic photoconductor 1.

Figure 2B:
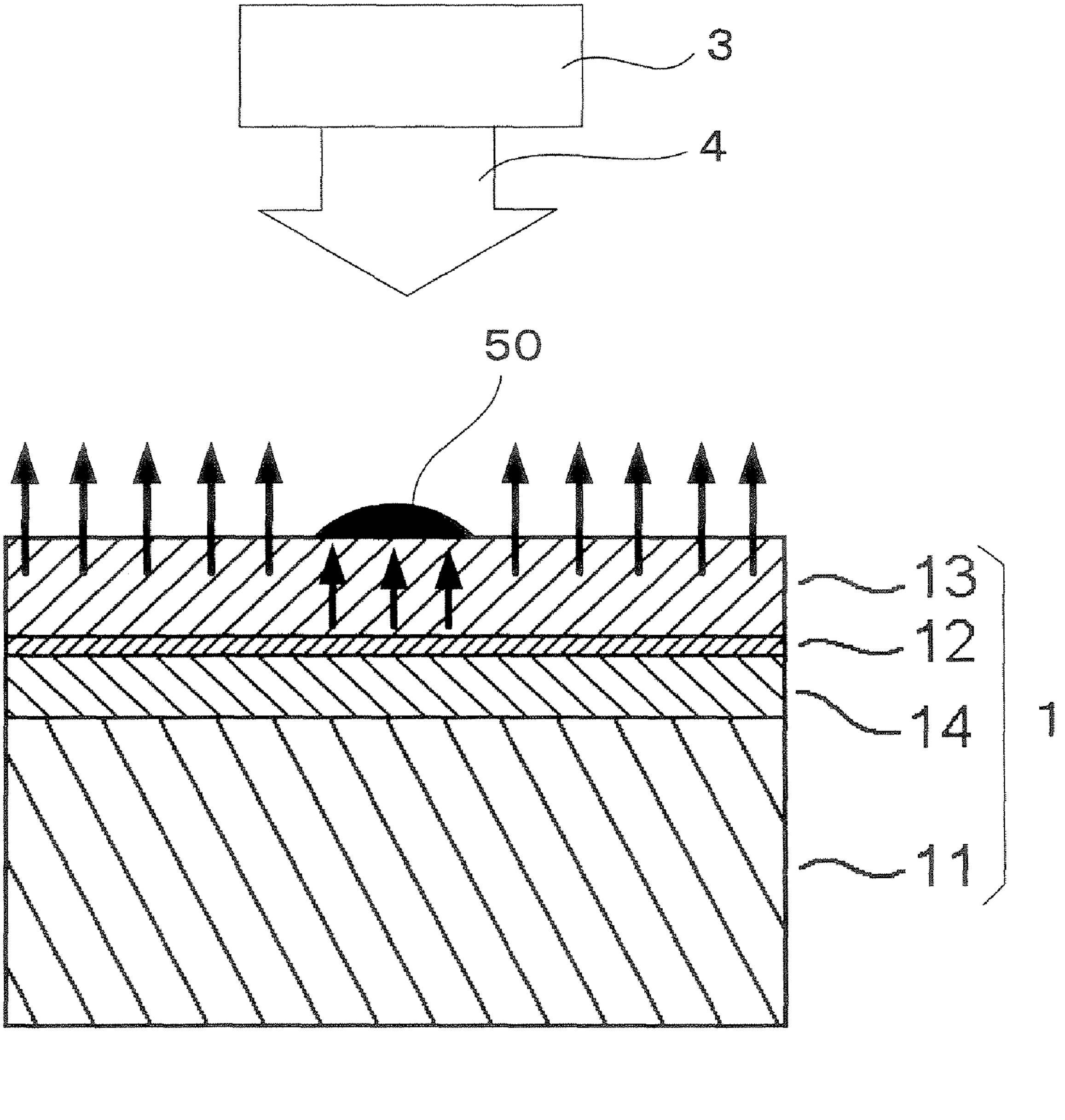
FIG. 2B is an illustrative view that shows a condition in which a filming exists on a surface of an electrophotographic photoconductor.

FIG. 2B is a conceptual view where a filming has occurred on the surface of electrophotographic photoconductor 1.

The light 4 irradiated to the surface of electrophotographic photoconductor 1 from the light source 3 is absorbed or interrupted by the filming 50, therefore, the irradiation light and the fluorescence are interrupted at the surface of electrophotographic photoconductor 1. As the filming amount increases, the emission amount of fluorescence decreases, the image brightness decreases, and the filming portions can be visualized as dark portions.

Accordingly, the detection of the fluorescence intensity emitted from the electrophotographic photoconductor makes possible to find the filming occurrence; in other words, the observation of fluorescence emitted from photoconductors may make possible to find definitely the fouling or deposit even the cases of initial filmings or slight filmings hardly observable from reflected light.

Figure 3:
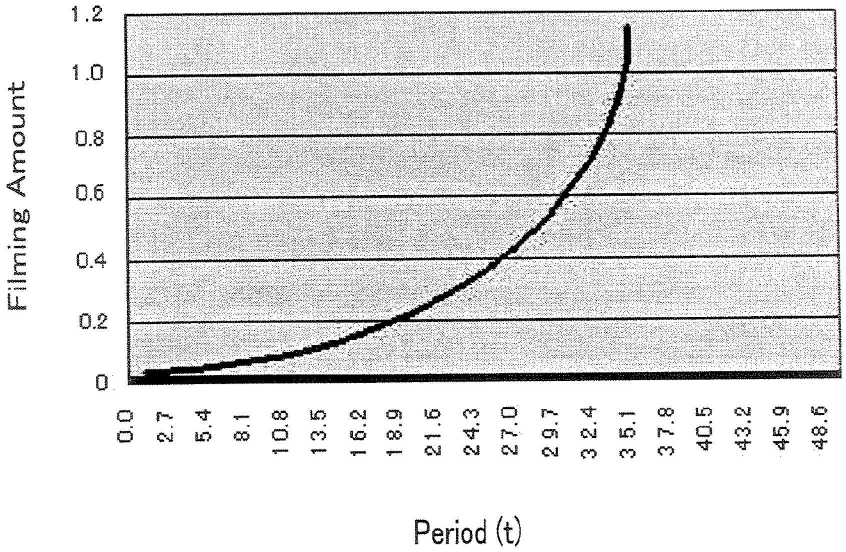
FIG. 3 is a graph that shows an incremental change of filming amount with time on a partial electrophotographic photoconductor during continuous image formation by an image forming apparatus.

FIG. 3 is a graph that shows an incremental change of filming amount with time on a partial electrophotographic photoconductor during a continuous image formation by an image forming apparatus such as copiers and printers.

Preferable embodiments in terms of methods and apparatuses for evaluating electrophotographic photoconductors will be explained with reference to figures in the following.

First Embodiment

Figure 4:
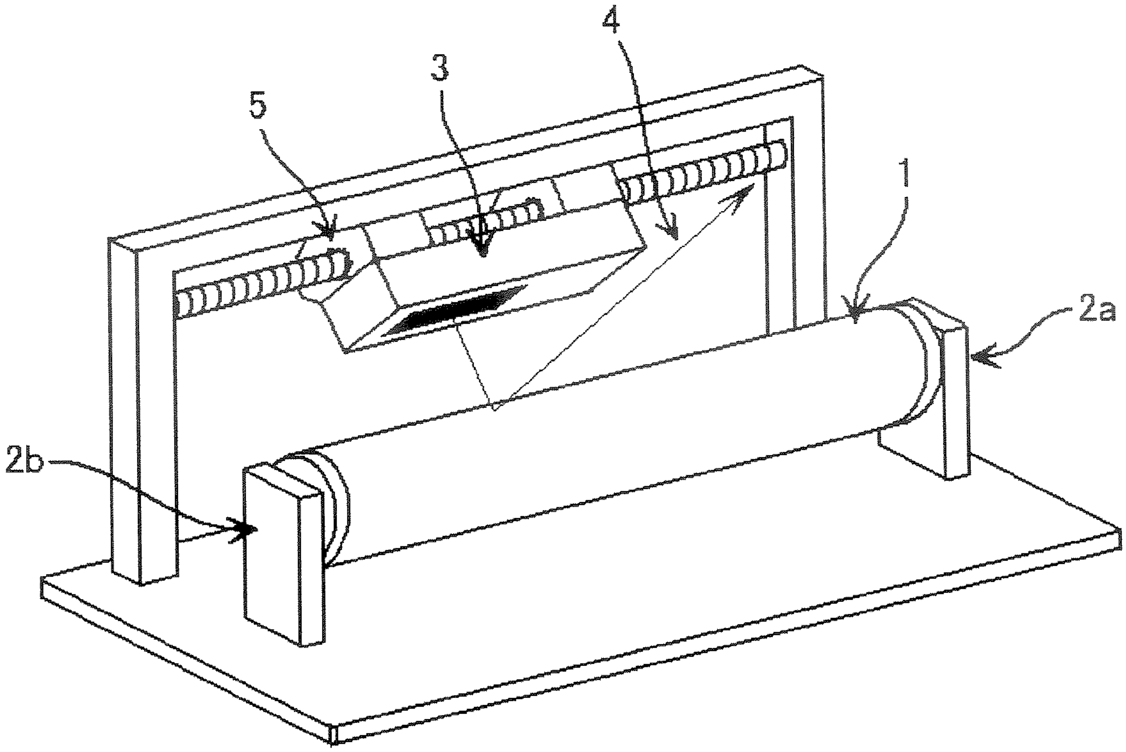
FIG. 4 is a schematic perspective view that exemplarily shows an inventive device for visually evaluating electrophotographic photoconductors.

FIG. 4 is an exemplary view that shows a method for evaluating electrophotographic photoconductors in the first embodiment of the present invention. In FIG. 4, both ends of the electrophotographic photoconductor 1 are rotatably sustained by sustainers 2*a*, 2*b*. The electrophotographic photoconductor 1 may be rotated manually or by a driving source such as a motor.

The shape of electrophotographic photoconductors may be drum-like as shown in FIG. 4 or other shapes such as belt-like and sheet-like.

The UV ray source 3 in FIG. 4 is movable along the axial direction of electrophotographic photoconductor 1 by means of traveling mechanism 5.

There exit a light path 4 from the UV ray source 3 in FIG. 4; the light emitted from UV ray source 3 irradiates the electrophotographic photoconductor 1 to emit fluorescence, which is visually observed. In addition, FIG. 4 shows one UV ray source 3, which may exist two or more.

When the device for evaluating electrophotographic photoconductors shown in FIG. 4 is set at dark rooms or places surrounded by blackout curtains so as to interrupt environmental lights, the fluorescence emitted from electrophotographic photoconductors can be definitely observed. The wavelength of the UV ray source 3 is preferably 200 to 420 nm, more preferably 240 to 270 nm.

The illumination intensity of the UV rays is preferably 100 $\mu W/cm^2$ to 1000 $\mu W/cm^2$ at the surface of electrophotographic photoconductors, more preferably 200 $\mu W/cm^2$ to 700 $\mu W/Cm^2$.

The irradiation period of the UV rays of 200 nm to 420 nm wavelength onto electrophotographic photoconductors is preferably no longer than 1 minute per once, more preferably no longer than 30 seconds, still more preferably no longer than 5 seconds.

The UV ray source 3 may be, for example, a mercury lump, mercury xenon lump, high-pressure mercury lump or light-emitting diode (LED).

The filming occurrence or deposit may be observed for the electrophotographic photoconductor removed from a process cartridge as shown in FIG. 4, alternatively, may be observed for a partially visible portion of electrophotographic photoconductor mounted on a process cartridge.

Second Embodiment

Figure 5:
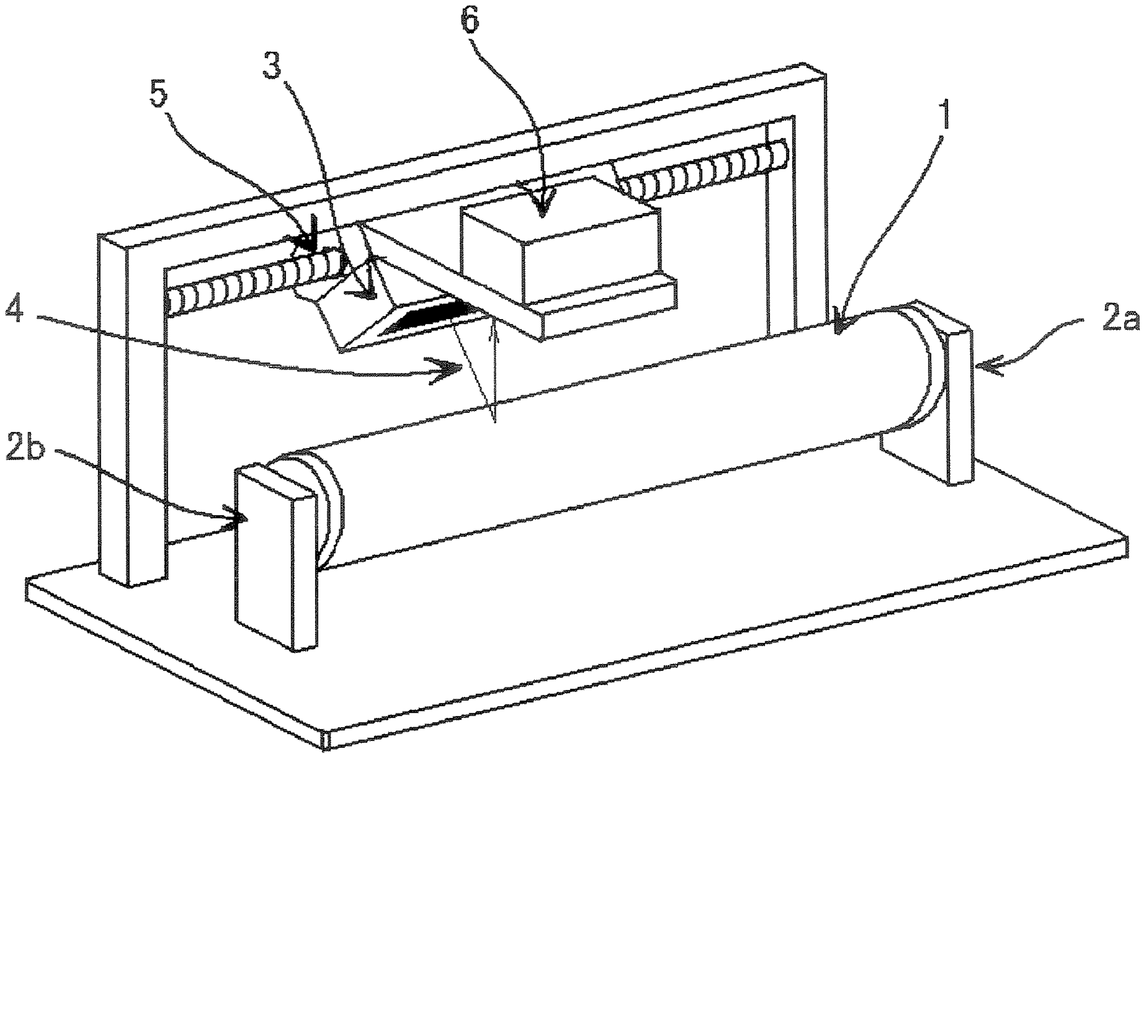
FIG. 5 is a schematic perspective view that exemplarily shows an inventive device for evaluating electrophotographic photoconductors using an image receiving unit.

FIG. 5 is an exemplary view that shows a device for evaluating electrophotographic photoconductors in the second embodiment of the present invention. In FIG. 5, both ends of the electrophotographic photoconductor 1 are rotatably sustained by sustainers 2*a*, 2*b*. The electrophotographic photoconductor 1 may be rotated manually or by a driving source such as a motor.

The shape of electrophotographic photoconductors may be drum-like as shown in FIG. 5 or other shapes such as belt-like and sheet-like.

The UV ray source 3 in FIG. 5 is movable along the axial direction of electrophotographic photoconductor 1 by means of traveling mechanism 5.

There exit a light path 4 from the UV ray source 3 in FIG. 5; the light emitted from UV ray source 3 irradiates the electrophotographic photoconductor 1 to emit fluorescence, which is observed and recorded by an image receiving unit 6. In addition, FIG. 5 shows one UV ray source 3, which may exist two or more.

The image receiving unit 6 may be various cameras, more specifically, in addition to conventional silver salt cameras, digital cameras may be employed that are equipped with CCDs or C-MOSs as the imaging devices, alternatively two-dimensional line sensors may be employed.

When the device for evaluating electrophotographic photoconductors shown in FIG. 5 is set at dark rooms or places surrounded by blackout curtains so as to interrupt environmental lights, the fluorescence emitted from electrophotographic photoconductors can be definitely observed.

The wavelength of the UV ray source 3 is preferably 200 to 420 nm, more preferably 240 to 270 nm.

The illumination intensity of the UV rays is preferably 100 $\mu W/cm^2$ to 1000 $\mu W/cm^2$ at the surface of electrophotographic photoconductors, more preferably 200 $\mu W/cm^2$ to 700 $\mu W/cm^2$.

The irradiation period of the UV rays of 200 to 420 nm wavelength onto electrophotographic photoconductors is preferably no longer than 1 minute per once, more preferably no longer than 30 seconds, still more preferably no longer than 5 seconds.

The UV ray source may be, for example, a mercury lump, mercury xenon lump, high-pressure mercury lump or light-emitting diode (LED).

The filming occurrence or deposit may be observed for the electrophotographic photoconductor 1 removed from a process cartridge as shown in FIG. 5, alternatively, may be observed for a partially visible portion of electrophotographic photoconductor mounted on a process cartridge.

Third Embodiment

Figure 6:
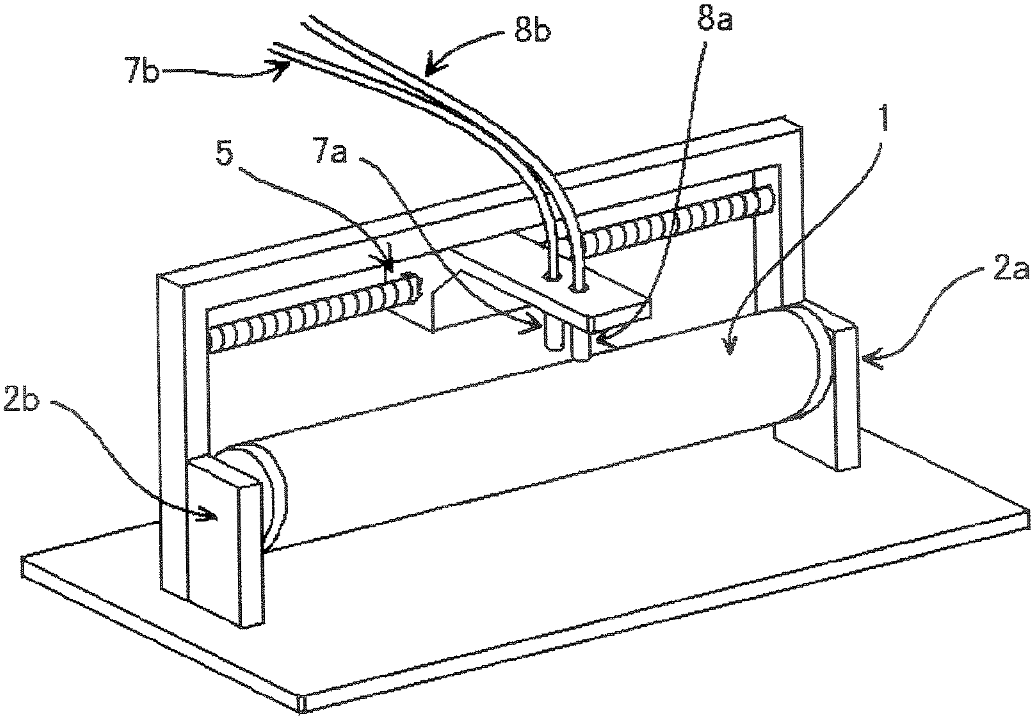
FIG. 6 is a schematic perspective view that exemplarily shows an inventive device for evaluating electrophotographic photoconductors using a light receiving unit.

FIG. 6 is an exemplary view that shows a device for evaluating electrophotographic photoconductors in the third embodiment of the present invention. In FIG. 6, both ends of the electrophotographic photoconductor 1 are rotatably sustained by sustainers 2*a*, 2*b*. The electrophotographic photoconductor 1 may be rotated manually or by a driving source such as a motor.

The shape of electrophotographic photoconductors may be drum-like as shown in FIG. 6 or other shapes such as belt-like and sheet-like.

In FIG. 6, there exist a UV ray source 7*a*, an electric cable to the UV ray source or UV ray path 7*b*, light receiving element 8*a*, and a cable 8*b* to transmit signals from the light receiving element. These are movable along the axial direction of electrophotographic photoconductor 1 by means of traveling mechanism 5.

When the device for evaluating electrophotographic photoconductors shown in FIG. 6 is set at dark rooms or places surrounded by blackout curtains so as to interrupt environmental lights, the fluorescence emitted from electrophotographic photoconductors can be definitely detected.

The wavelength of the UV ray source 3 is preferably 200 to 420 nm, more preferably 240 to 270 nm.

The illumination intensity of the UV rays is preferably 100 $\mu W/cm^2$ to 1000 $\mu W/cm^2$ at the surface of electrophotographic photoconductors, more preferably 200 $\mu W/cm^2$ to 700 $\mu W/cm^2$.

The irradiation period of the UV rays of 200 to 420 nm wavelength onto electrophotographic photoconductors is preferably no longer than 1 minute per once, more preferably no longer than 30 seconds, still more preferably no longer than 5 seconds.

The UV ray source 7*a* may be, for example, a mercury lump, mercury xenon lump, high-pressure mercury lump or light-emitting diode (LED).

The light-sensitive element 8*a* may be properly selected from those being sensitive to the fluorescence wavelength emitted from the electrophotographic photoconductors; examples thereof include photodiodes, phototransistors, CCD sensors and C-MOS sensors.

The filming occurrence or deposit may be observed for the electrophotographic photoconductor 1 removed from a process cartridge as shown in FIG. 6, alternatively, may be observed for a partially visible portion of electrophotographic photoconductor mounted on a process cartridge.

Fourth Embodiment

Figure 7:
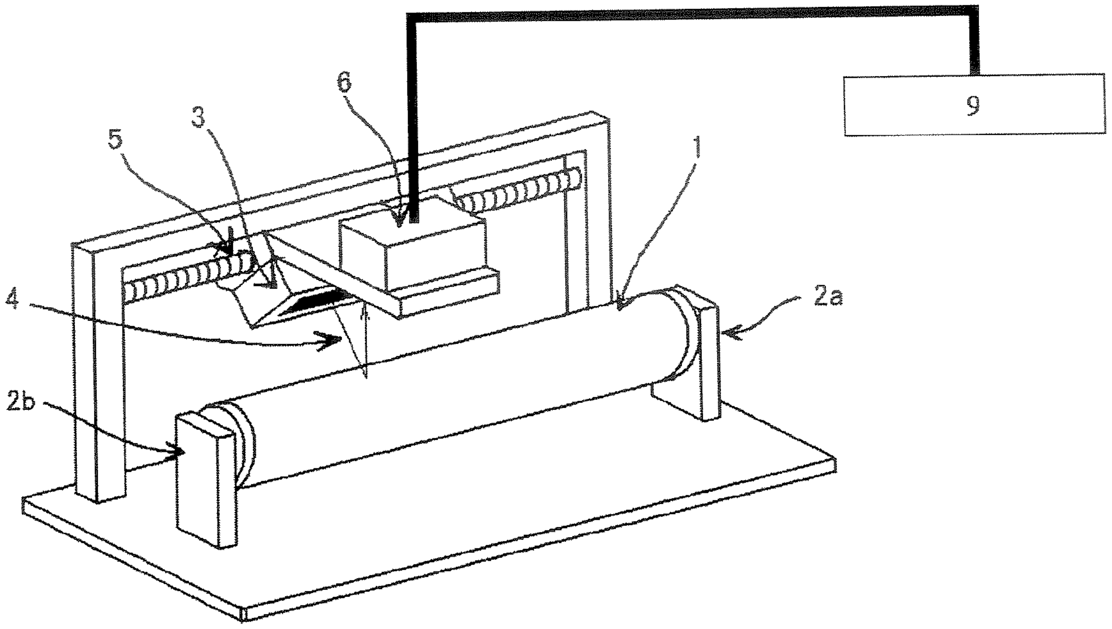
FIG. 7 is a schematic perspective view that exemplarily shows an inventive device for evaluating electrophotographic photoconductors.

FIG. 7 is an exemplary view that shows a device for evaluating electrophotographic photoconductors in the fourth embodiment of the present invention. In FIG. 6, both ends of the electrophotographic photoconductor 1 are rotatably sustained by sustainers 2*a*, 2*b*. The electrophotographic photoconductor 1 may be rotated manually or by a driving source such as a motor.

The shape of electrophotographic photoconductors may be drum-like as shown in FIG. 7 or other shapes such as belt-like and sheet-like.

In FIG. 7, there exists a UV ray source 3, which is movable along the axial direction of electrophotographic photoconductor 1 by means of traveling mechanism 5. In addition, FIG. 7 shows one UV ray source 3, which may exist two or more.

As shown in FIG. 7, the light emitted from the UV ray source 3 transmits through the light path 4 and irradiates the electrophotographic photoconductor 1, then the luminescent substance at the surface or inside of the electrophotographic photoconductor emit fluorescence. The fluorescence emitted from the electrophotographic photoconductor is introduced into the image receiving unit 6, thereby image data are obtained. The image data are processed by the image processing unit 9 thereby the difference of light amounts between the filming portion and non-filming portion (pure surface of the photoconductor) is measured. The image processing unit 9 has an algorithm to calculate the filming amount from the variation distribution in the longitudinal direction of the photoconductor.

The image receiving unit 6 may be various cameras, more specifically, in addition to conventional silver salt cameras, digital cameras may be employed that are equipped with CCDs or C-MOSs as the imaging devices, alternatively two-dimensional line sensors may be employed.

When the device for evaluating electrophotographic photoconductors shown in FIG. 7 is set at dark rooms or places surrounded by blackout curtains so as to interrupt environmental lights, the fluorescence emitted from electrophotographic photoconductors can be definitely detected.

The wavelength of the UV ray source 3 is preferably 200 to 420 nm, more preferably 240 to 270 nm.

The illumination intensity of the UV rays is preferably 100 $\mu W/cm^2$ to 1000 $\mu W/cm^2$ at the surface of electrophotographic photoconductors, more preferably 200 $\mu W/cm^2$ to 700 $\mu W/cm^2$.

The irradiation period of the UV rays of 200 to 420 nm wavelength onto electrophotographic photoconductors is preferably no longer than 1 minute per once, more preferably no longer than 30 seconds, still more preferably no longer than 5 seconds.

The UV ray source may be, for example, a mercury lump, mercury xenon lump, high-pressure mercury lump or light-emitting diode (LED).

The filming occurrence or deposit may be observed for the electrophotographic photoconductor 1 removed from a process cartridge as shown in FIG. 7, alternatively, may be observed for a partially visible portion of electrophotographic photoconductor mounted on a process cartridge.

Figure 8:
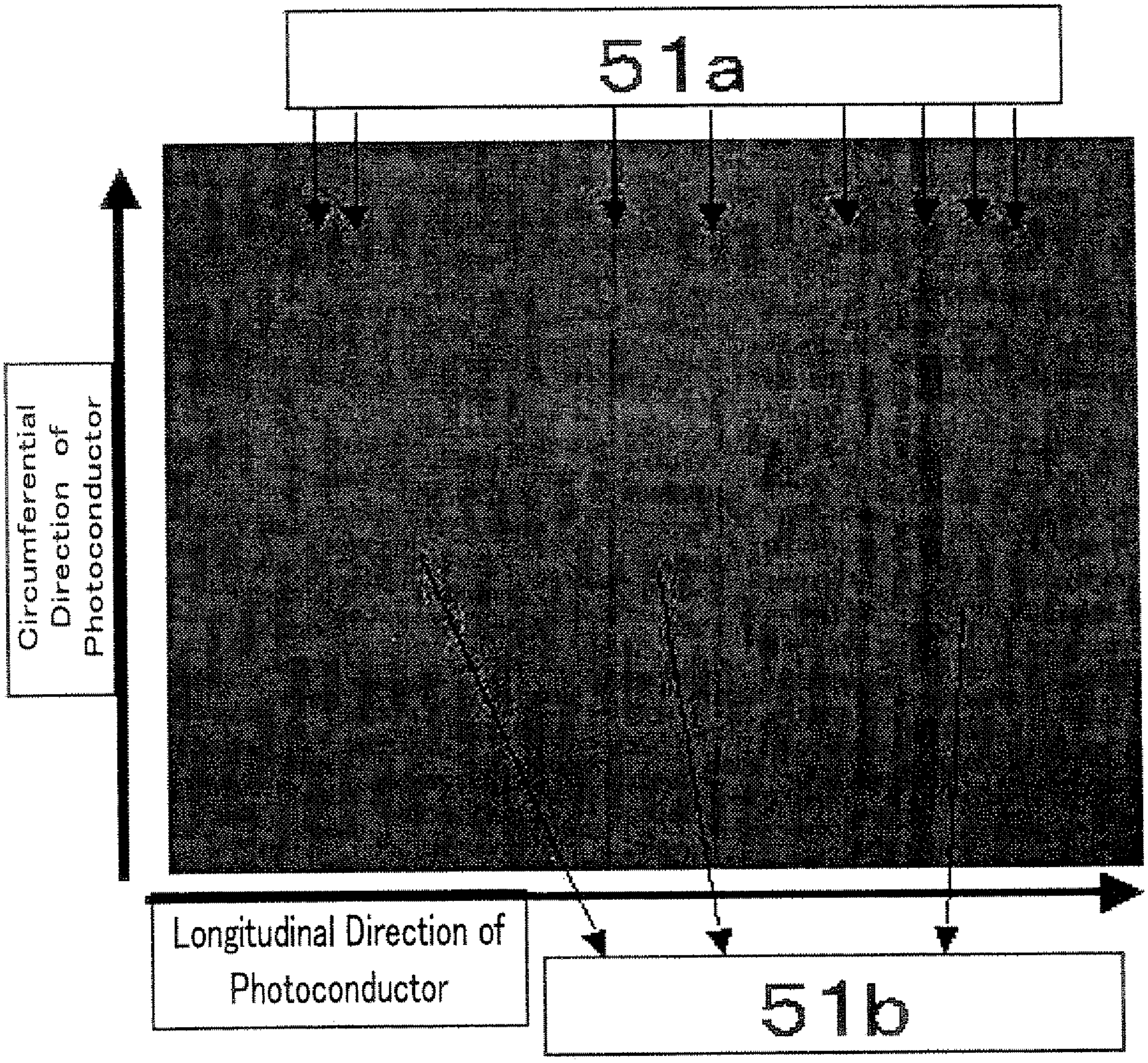
FIG. 8 is an exemplary image that is received by an image receiving unit for evaluating an electrophotographic photoconductor after repeating image formation for a period.

FIG. 8 is an exemplary image received by the image receiving unit 6 of the device for evaluating electrophotographic photoconductors shown in FIG. 7, where the image was formed by use of the electrophotographic photoconductor 1 after having been used for forming images in copy action for a certain period. The resulting image was of color, which is transferred into the monochrome image.

In FIG. 8, the portions 51*a* are those where the fluorescence emission is interrupted at the surface of the electrophotographic photoconductor 1; the black streaks are the filming portions; and the portions 51*b* are the non-filming portions (pure surface of the photoconductor) where the fluorescence is emitted from the surface of the electrophotographic photoconductor 1. The traverse direction of this image corresponds to the longitudinal direction (axial direction), and the lengthwise direction of this image is the circumferential direction of the electrophotographic photoconductor. It is understood from this image of FIG. 8, the filming portions 51*a* on the surface of the electrophotographic photoconductor extend in the circumferential direction on the photoconductor surface and black streaks have generated.

Figure 9:
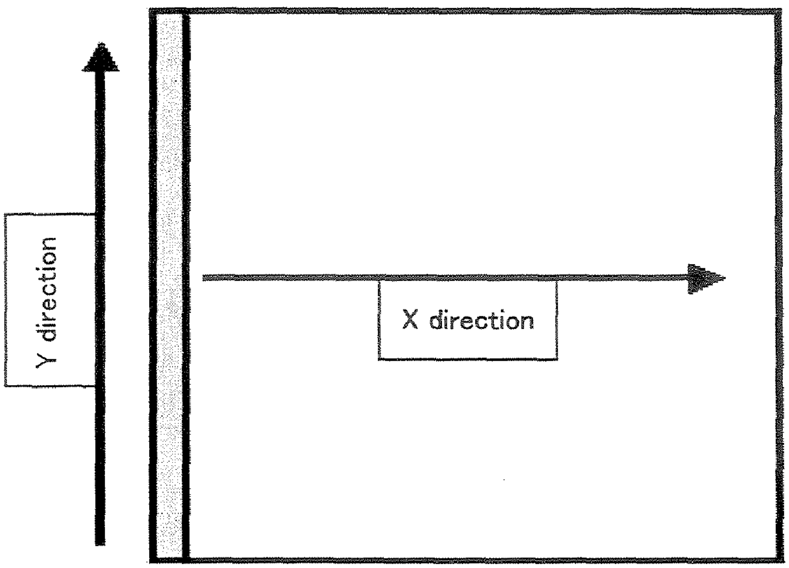
FIG. 9 is a schematic view that exemplarily shows a digitalizing method for detecting filming portions and non-filming portions by image-processing an image using an image-processing unit.

FIG. 9 illustrates a digitizing process in order to detect the filming portions and the non-filming portions (pure surface of the photoconductor) on the surface of electrophotographic photoconductor through image-processing the images received into the image receiving unit 6 by the image processing unit 9.

Initially, the respective pixels of images received into the image receiving unit 6 are transformed into physical amounts of R (red) image data, G (green) image data and B(blue) image data to obtain the RGB image data of all pixels. Then, the RGB image signal data of Y direction (circumferential direction of the photoconductor) are calculated for product sum, the averages of product sums of circumferential direction are calculated versus the all pixel number in the X direction (longitudinal direction of the photoconductor) and digitized.

Figure 10A:
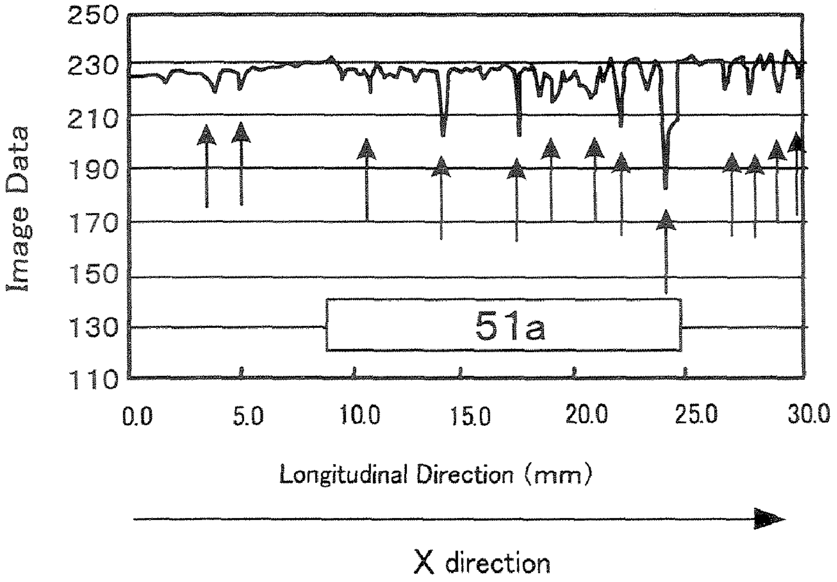
FIG. 10A is a graph between production sums of image data at filming portions in circumferential direction and its distribution in longitudinal direction of a photoconductor.
Figure 12:
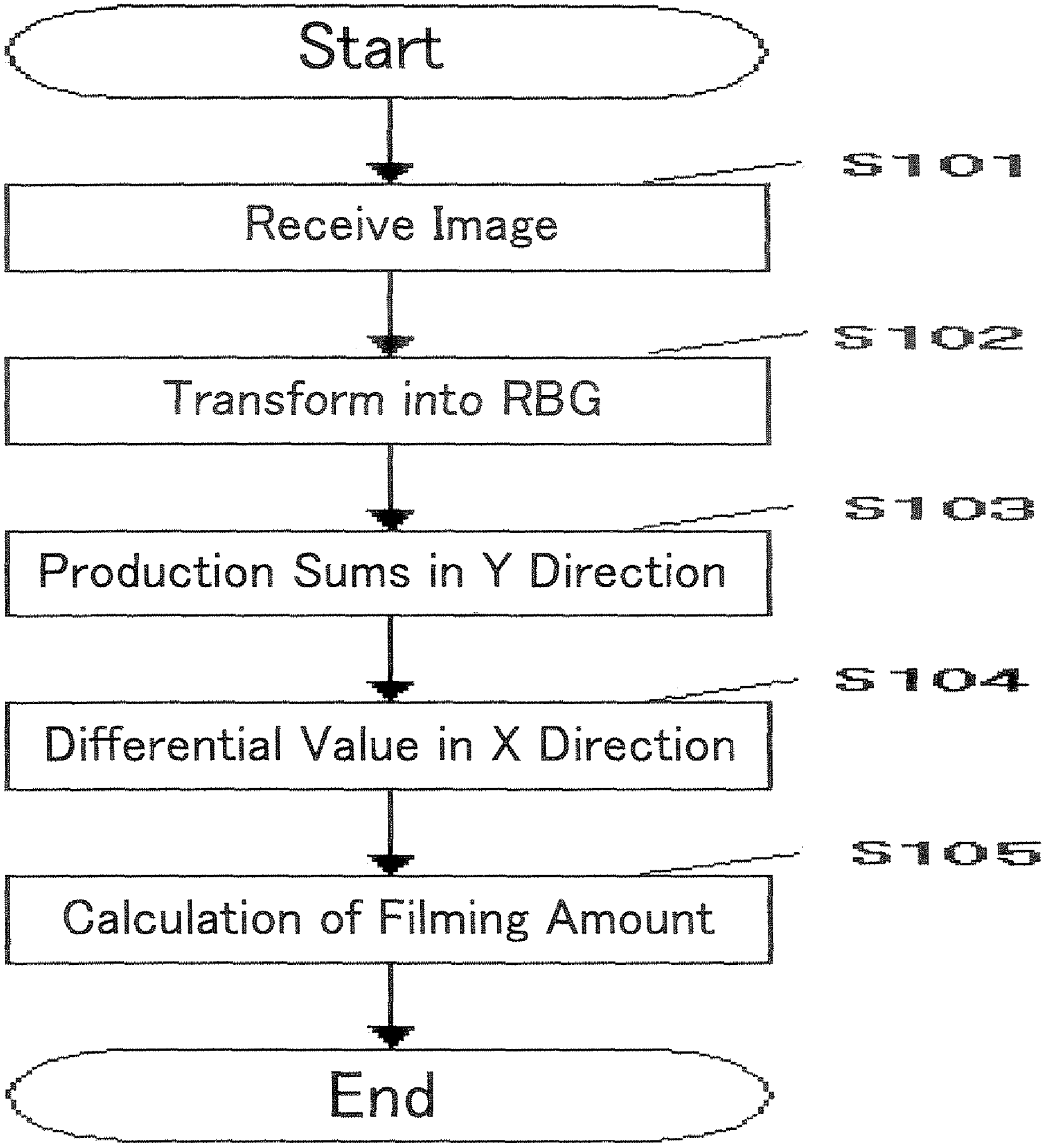
FIG. 12 is a flowchart that shows an image processing flow in an image processing unit.

FIG. 12 is a flowchart that shows the image processing steps in the image processing unit. Initially, an image is received by the image receiving unit 6 (S101). Then all pixels of the received image are transformed into physical amounts of RGB image data by the R (red) image data-transform portion, G (green) image data-transform portion and B (blue) image data-transform portion. Then the product sums of image data signals of the total pixel number in Y direction (circumferential direction of the photoconductor) are derived versus the X direction of the image (longitudinal direction of the photoconductor), and the average is calculated (S103). Then the image data of the reference photoconductor (pure surface of the photoconductor) shown in FIG. 10B and the image data in the X direction (longitudinal direction of the photoconductor) shown in FIG. 10A are calculated for the differential values (S104). Then the light-amount variation of image data on the photoconductor surface can be derived from the differential values. The filming amount is calculated from the variation data (S105). Consequently, the deposit on the electrophotographic photoconductor can be detected by the light emitted from the photoconductor surface and the filming amount can be quantified.

FIG. 10A is a graph that shows production sums of circumferential image data at filming portions 51*a* calculated in S103 of FIG. 12, in which the production sums are expressed as the distribution in the longitudinal direction of the photoconductor.

In FIG. 10A, X axis is the longitudinal direction of the photoconductor, Y axis expresses the average production sums of image signals in the circumferential direction of the photoconductor. Corresponding to the filming portions on the surface of the electrophotographic photoconductor, the variation of light amount appears.

Figure 10B:
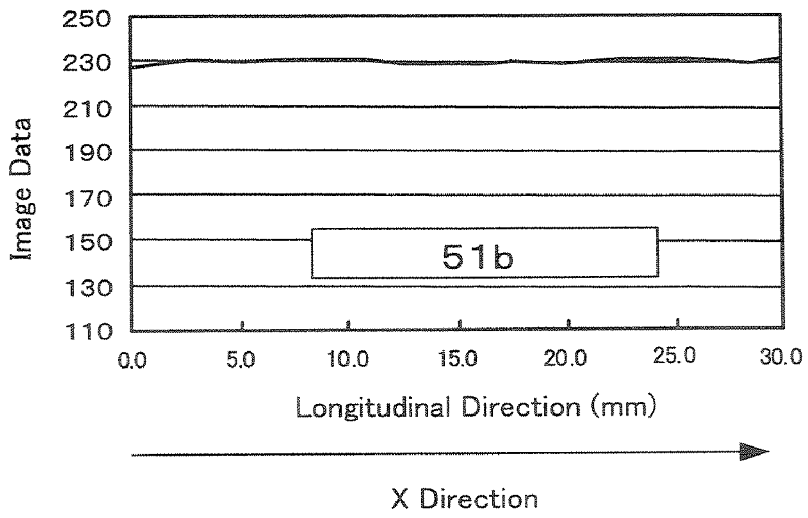
FIG. 10B is another graph between production sums of image data at non-filming portions in circumferential direction and its distribution in longitudinal direction of a photoconductor.

FIG. 10B is a graph that shows production sums at non-filming portions 51*b* of longitudinal image data calculated in S103 of FIG. 12, in which the production sums are expressed as the distribution in the circumferential direction of the photoconductor.

In FIG. 10B, X axis is the longitudinal direction of the photoconductor, Y axis expresses the average production sums of image signals in the circumferential direction of the photoconductor. Since the image data are of the reference photoconductor (clean photoconductor), there appears no variation of light amount and the distribution is flat in the longitudinal direction of the photoconductor.

In accordance with the inventive method for evaluating electrophotographic photoconductors, existence or non-existence of filmings can be detected by the difference of the light amount. The light amount at the sites of filming occurrence (filming portions) drops in comparison with the sites of non-filming (clean surface). The drop level (differential value) is defined as the filming amount at the site, the drop level is calculated over an entire image on the photoconductor surface, and the production sum is designated as the filming amount at a certain portion of the photoconductor. This is carried out for entire surface of the photoconductor, thereby the filming amount can be obtained over the entire surface of the photoconductor.

Figure 11A:
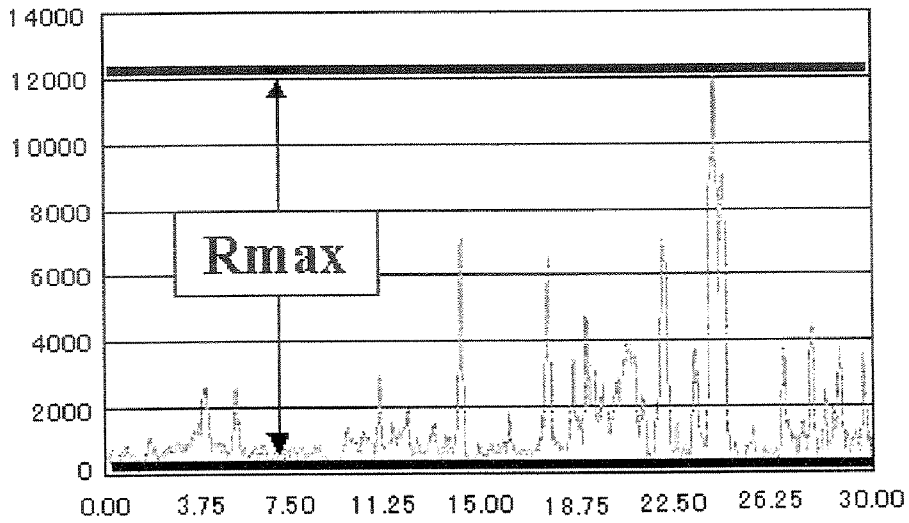
FIG. 11A is a graph of filming amounts in which the difference at filming portions and at non-filming portions is defined as Rmax and the Rmax is presumed as the filming amount.
Figure 11B:
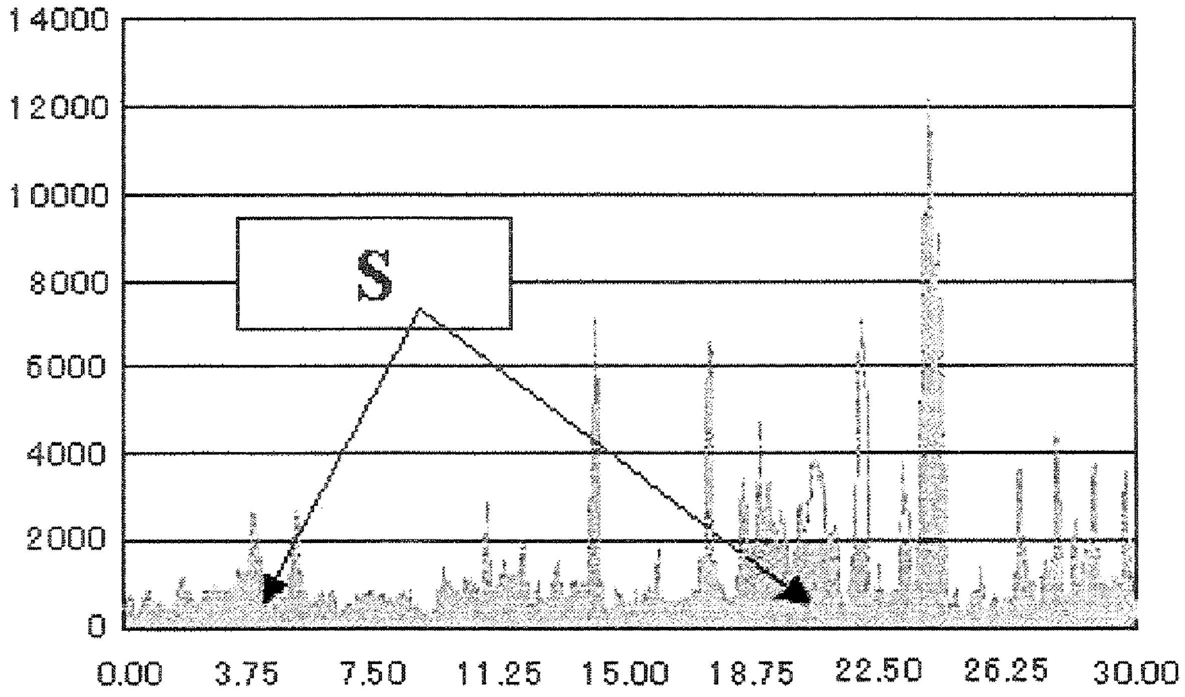
FIG. 11B is a graph of filming amounts in which the area S of filming portions is presumed as the filming amount.

For example, in the graphs of FIGS. 11A and 11B, the deposit amount was calculated from the circumferential product sum and the distribution in the longitudinal direction of the photoconductor calculated in FIGS. 10A and 10B; in FIG. 11, the difference at the filming portions 51*a* and non-filming portions 51*b* is defined as Rmax, and the Rmax is considered as the filming amount on the photoconductor surface.

In the FIG. 11B, the filming amount is obtained as the surface S of the filming portions 51*a* on the photoconductor surface.

As such, measurements of fluorescence intensity emitted from electrophotographic photoconductors make possible to determine the filming amount. Therefore, the observation of fluorescence emitted from photoconductors may make possible to find definitely the fouling or deposit even in such cases as initial filmings or slight filmings hardly observable from reflected light.

In addition to such visual inspection, the algorithm for quantifying the filming may make possible to determine the ordinary filming amount.

Method For Reusing Electrophotographic Photoconductor

In accordance with the inventive method for reusing electrophotographic photoconductors, electrophotographic photoconductors after use are evaluated for the usability, usable photoconductors are selected and reused, the evaluation with respect to the usability of the electrophotographic photoconductors is carried out in accordance with the inventive method for evaluating electrophotographic photoconductors described above.

The inventive method for reusing electrophotographic photoconductors is excellent in view of resource saving and energy saving since sufficiently usable electrophotographic photoconductors can be reused even after use.

It is preferred that the electrophotographic photoconductors after use described above are those having experienced 1000 or more sheets of imaging.

The ten-point average surface roughness (Rz) of the electrophotographic photoconductors after use is preferably 0.01 μm to 3 μm, more preferably 0.1 μm to 3 μm. There exist many flaws or streaks on the surface of the electrophotographic photoconductors after use, thus the filming occurrence is hardly detectable due to confusion with the flaws or streaks; whereas the inventive method for evaluating electrophotographic photoconductors may provide definite and accurate inspection, thus providing easy determination as to the usability.

The ten-point average surface roughness (Rz) can be measured by use of the surface roughness meter in accordance with JIS B0601-1994.

The electrophotographic photoconductors comprises at least an undercoat layer, charge generating layer, and charge transport layer in this order on a support; preferably, the undercoat layer contains a pigment. The content of the pigment in the undercoat layer is preferably 10% by mass or less. As such, even when the content of the pigment is 10% by mass or less in the undercoat layer, definite and accurate evaluation can be provided without being influenced by processing traces on the support Various embodiments of the inventive method for reusing electrophotographic photoconductors will be explained with reference to figures.

First Embodiment

Figure 15A:
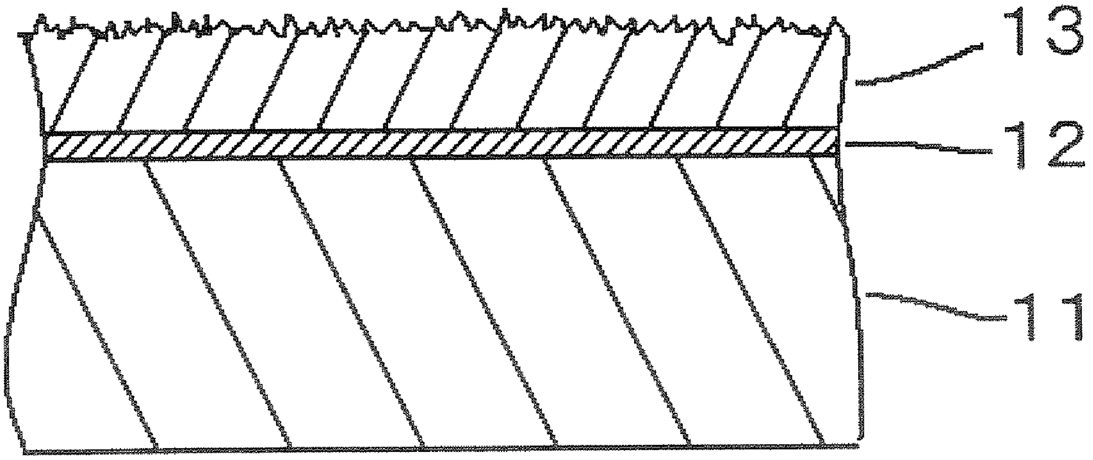
FIG. 15A is a schematic cross-section that illustrates exemplarily an electrophotographic photoconductor after use.

FIG. 15A shows a configuration where a charge generating layer 12 that contains a charge generating substance and an optional binder resin and a charge transport layer 13 that contains a charge transport substance and a binder resin are laminated in this order on a support 11. Slight and shallow flaws have generated on the surface 13 of the electrophotographic photoconductor in the circumferential direction through 1000 or more sheets of imaging. The flaws are mainly caused by contact with a cleaning blade or cleaning brush; the ten-point average surface roughness (Rz) is no more than 0.1 μm by use of the surface roughness meter in accordance with JIS B0601-1994.

Figure 16A:
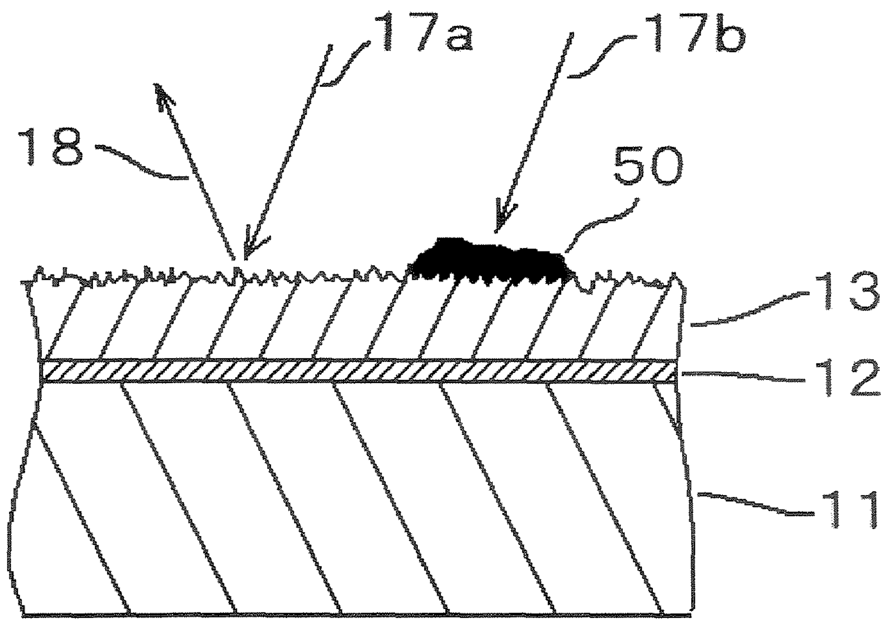
FIG. 16A is a schematic cross-section that illustrates a condition to evaluate the electrophotographic photoconductor shown in FIG. 15A.

FIG. 16A is a conceptual view that shows a principal to irradiate UV rays with a wavelength of 200 to 420 nm onto the surface of the electrophotographic photoconductor shown in FIG. 15A and to measure a fluctuation of fluorescence emitted by the electrophotographic photoconductor. Slight and shallow flaws have generated on the surface of the charge transport layer 13 in the circumferential direction of the electrophotographic photoconductor through 1000 or more sheets of imaging, and deposit 50 exists partially on the charge transport layer 13. When UV rays 17*a* are irradiated onto the electrophotographic photoconductor with such a surface condition, the UV rays arrived at the charge transport layer 13 through a path with no deposit cause to emit fluorescence 18 from a charge transport substance in the charge transport layer. However, the UV rays 17*b* are interrupted by a deposit 50 on the path, thus do not arrive at the charge transport layer 13 and no fluorescence is emitted.

Accordingly, the observation of the fluctuation caused for the fluorescence 18 may make possible to detect the deposit 50 even of small amounts, regardless of the surface condition of the charge transport layer 13. Here, the deposit 50 is typically of very small amounts and transparent, thus the deposit 50 cannot be distinguished from surface irregularities of the charge transport layer 13 and the detection is difficult under visual lights such as of dim bulbs and filament lamps.

Second Embodiment

Figure 15B:
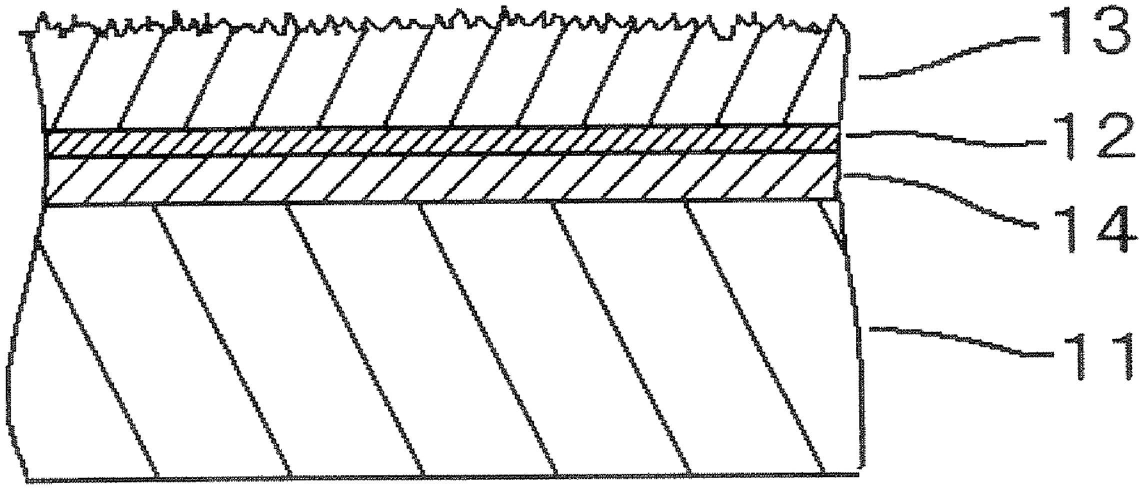
FIG. 15B is a schematic cross-section that illustrates exemplarily another electrophotographic photoconductor after use.

FIG. 15B shows a configuration where an undercoat layer 14 is formed on a support 11, and a charge generating layer 12 that contains a charge generating substance and an optional binder resin and a charge transport layer 13 that contains mainly a charge transport substance and a binder resin are laminated in this order on the undercoat layer. Slight and shallow flaws have generated on the surface of the charge transport layer 13 in the circumferential direction of the electrophotographic photoconductor through 1000 or more sheets of imaging. The flaws are mainly caused by contact with a cleaning blade or cleaning brush; the ten-point average surface roughness (Rz) is no more than 0.1 μm by use of the surface roughness meter in accordance with JIS B0601-1994.

Figure 16B:
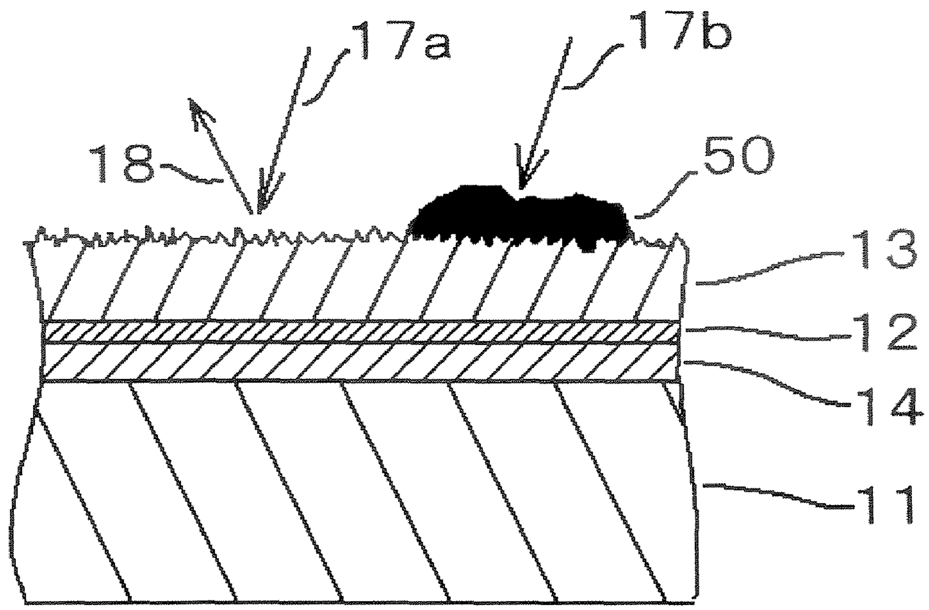
FIG. 16B is a schematic cross-section that illustrates a condition to evaluate the electrophotographic photoconductor shown in FIG. 15B.

FIG. 16B is a conceptual view that shows a principal to irradiate UV rays with a wavelength of 200 to 420 nm onto the surface of the electrophotographic photoconductor shown in FIG. 15B and to measure a fluctuation of fluorescence emitted by the electrophotographic photoconductor. Slight and shallow flaws have generated on the surface of the charge transport layer 13 in the circumferential direction of the electrophotographic photoconductor through 1000 or more sheets of imaging, and deposit 50 exists partially on the charge transport layer 13. When UV rays 17*a*, 17*b* are irradiated onto the electrophotographic photoconductor with such a surface condition, the UV rays arrived at the charge transport layer 13 through a path with no deposit cause to emit fluorescence 18 from a charge transport substance in the charge transport layer. However, the UV rays 17*b* are interrupted by a deposit 50 on the path, thus do not arrive at the charge transport layer 13 and no fluorescence is emitted.

Accordingly, the observation of the fluctuation caused for the fluorescence 18 may make possible to detect the deposit 50 even of small amounts, regardless of the surface condition of the charge transport layer 13. Here, the deposit 50 is typically of very small amounts and transparent, thus the deposit 50 cannot be distinguished from surface irregularities of the charge transport layer 13 and the detection is difficult under visual lights such as of dim bulbs and filament lamps.

Third Embodiment

Figure 15C:
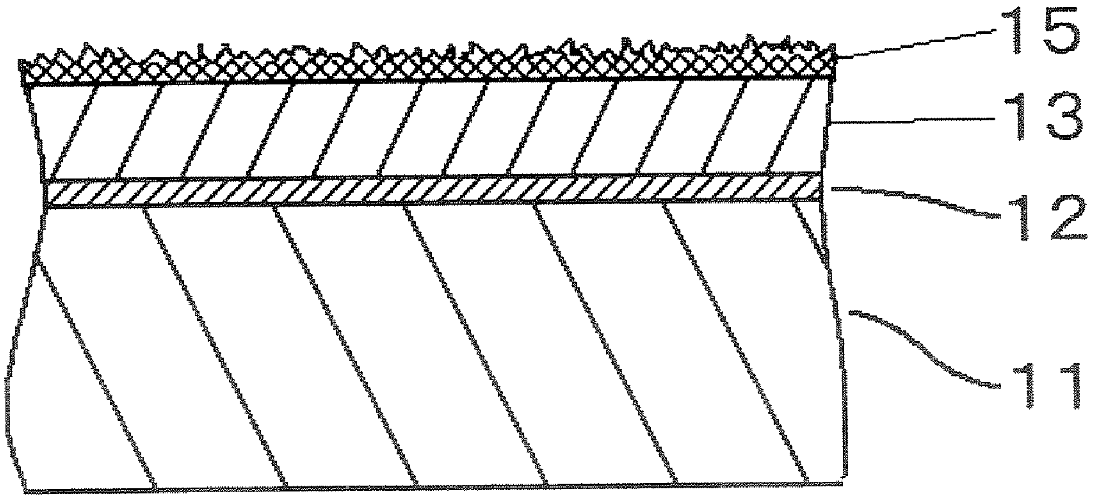
FIG. 15C is a schematic cross-section that illustrates exemplarily another electrophotographic photoconductor after use.

FIG. 15C shows a configuration where a charge generating layer 12 that contains a charge generating substance and an optional binder resin, a charge transport layer 13 that contains a charge transport substance and a binder resin, and a protective layer 15 are laminated in this order. In the electrophotographic photoconductor, slight and shallow flaws have generated on the surface of the protective layer 15 in the circumferential direction of the electrophotographic photoconductor through 1000 or more sheets of imaging. The flaws are mainly caused by contact with a cleaning blade or cleaning brush; the ten-point average surface roughness (Rz) is no more than 0.1 μn by use of the surface roughness meter in accordance with JIS B0601-1994.

Figure 16C:
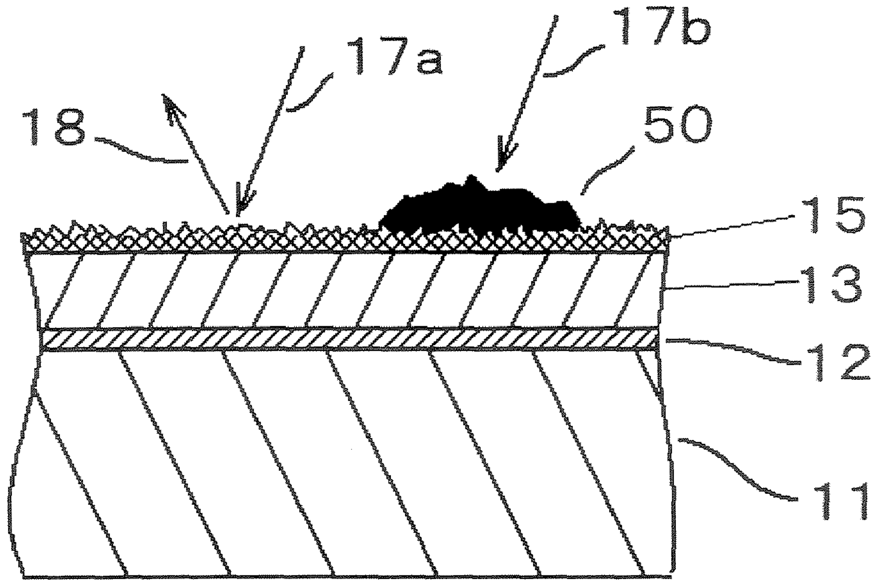
FIG. 16C is a schematic cross-section that illustrates a condition to evaluate the electrophotographic photoconductor shown in FIG. 15C.

FIG. 16C is a conceptual view that shows a principal to irradiate UV rays with a wavelength of 200 to 420 nm onto the surface of the electrophotographic photoconductor shown in FIG. 15C and to measure a fluctuation of fluorescence emitted by the electrophotographic photoconductor. Slight and shallow flaws have generated on the surface of the protective layer 15 in the circumferential direction of the electrophotographic photoconductor through 1000 or more sheets of imaging, and deposit 50 exists partially on the protective layer 15. When UV rays 17*a* are irradiated onto the electrophotographic photoconductor with such a surface condition, the UV rays arrived at the protective layer 15 through a path with no deposit cause to emit fluorescence 18 from a charge transport substance in the protective layer. However, the UV rays 17*b* are interrupted by a deposit 50 on the path, thus do not arrive at the protective layer 15 and no fluorescence is emitted.

Accordingly, the observation of the fluctuation caused for the fluorescence 18 may make possible to detect the deposit 50 even of small amounts, regardless of the surface condition of the protective layer 15. Here, the deposit 50 is typically of very small amounts and transparent, thus the deposit 50 cannot be distinguished from surface irregularities of the protective layer 15 and the detection is difficult under visual lights such as of dim bulbs and filament lamps.

Fourth Embodiment

Figure 15D:
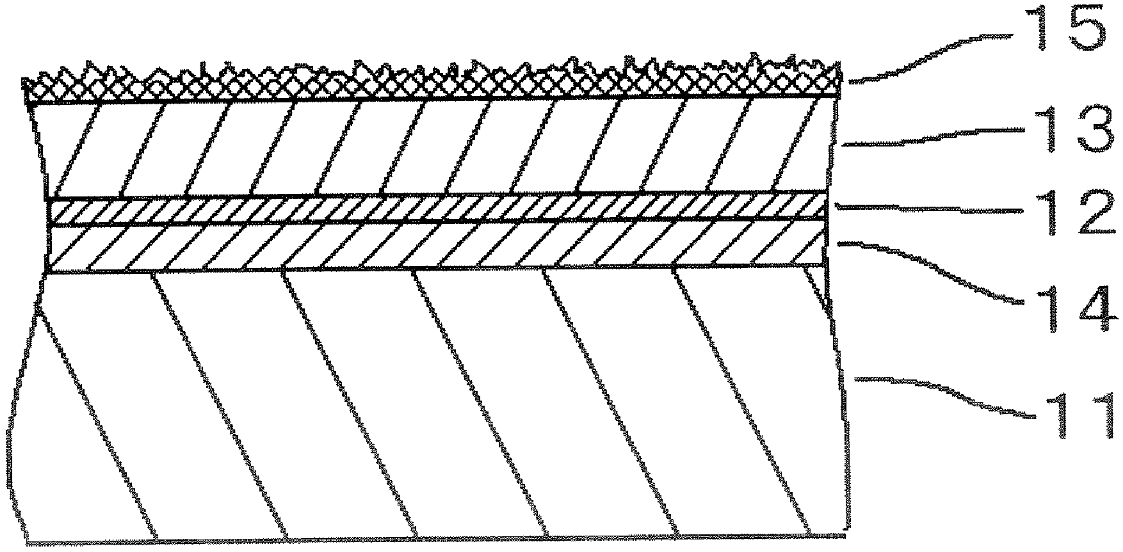
FIG. 15D is a schematic cross-section that illustrates exemplarily another electrophotographic photoconductor after use.

FIG. 15D shows a configuration where an undercoat layer 4 is formed on a support 11, a charge generating layer 12 that contains a charge generating substance and an optional binder resin, a charge transport layer 13 that contains a charge transport substance and a binder resin, and a protective layer 15 are laminated in this order. Slight and shallow flaws have generated on the surface of the protective layer 15 in the circumferential direction of the electrophotographic photoconductor through 1000 or more sheets of imaging. The flaws are mainly caused by contact with a cleaning blade or cleaning brush; the ten-point average surface roughness (Rz) is no more than 0.1 μm by use of the surface roughness meter in accordance with JIS B0601-1994.

Figure 16D:
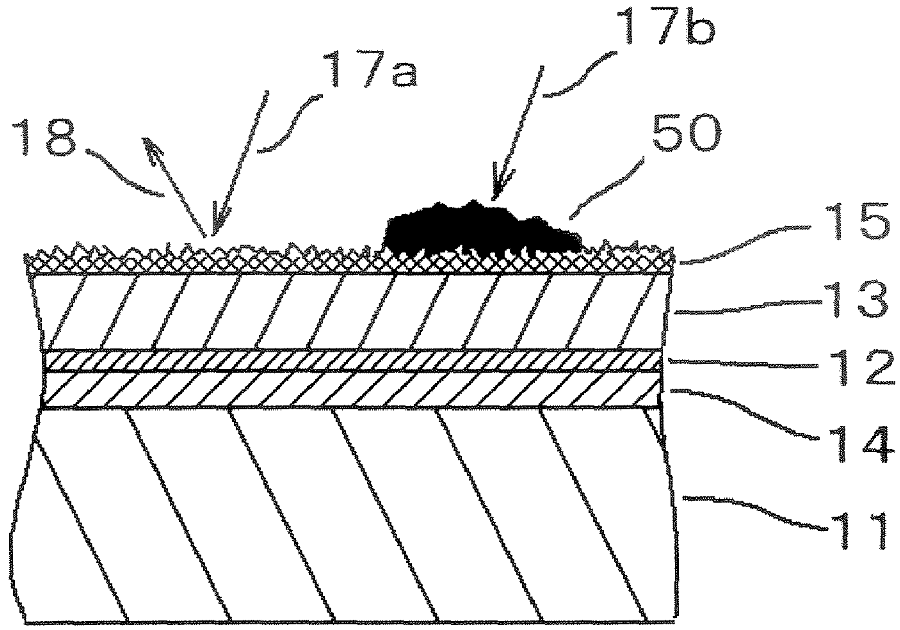
FIG. 16D is a schematic cross-section that illustrates a condition to evaluate the electrophotographic photoconductor shown in FIG. 15D.

FIG. 16D is a conceptual view that shows a principal to irradiate UV rays with a wavelength of 200 to 420 nm onto the surface of the electrophotographic photoconductor shown in FIG. 15D and to measure a fluctuation of fluorescence emitted by the electrophotographic photoconductor. Slight and shallow flaws have generated on the surface of the protective layer 15 in the circumferential direction of the electrophotographic photoconductor through 1000 or more sheets of imaging, and deposit 50 exists partially on the protective layer 15. When UV rays 17*a* are irradiated onto the electrophotographic photoconductor with such a surface condition, the UV rays arrived at the protective layer 15 through a path with no deposit cause to emit fluorescence 18 from a charge transport substance in the protective layer. However, the UV rays 17*b* are interrupted by a deposit 50 on the path, thus do not arrive at the protective layer 15 and no fluorescence is emitted.

Accordingly, the observation of the fluctuation caused for the fluorescence 18 may make possible to detect the deposit 50 even of small amounts, regardless of the surface condition of the protective layer 15. Here, the deposit 50 is typically of very small amounts and transparent, thus the deposit 50 cannot be distinguished from surface irregularities of the protective layer 15 and the detection is difficult under visual lights such as of dim bulbs and filament lamps.

Fifth Embodiment

The electrophotographic photoconductor of the fifth embodiment comprises at least an undercoat layer, a charge generating layer, and a charge transport layer in this order on a support, and the undercoat layer contains a pigment.

The content of the pigment in the undercoat layer is preferably 10% by mass or less. Even the content of the pigment is 10% by mass or less in the undercoat layer, definite and accurate inspection can be provided without being influenced by processing traces on the support. The pigment may be properly selected depending on the application from organic pigments and inorganic pigments.

In cases where the content of the pigment is 10% by mass or less in the undercoat layer, the undercoat layer is transparent or translucent, and when the electrophotographic photoconductors are observed from the surface, processing traces of supports are seen; therefore the inspection of deposits on the surface of electrophotographic photoconductors suffers from difficult detection due to confusion with the processing traces.

However, when UV rays are irradiated onto the electrophotographic photoconductors, the UV rays arrived at the charge transport layer through a path with no deposition induce the charge transport substance in the charge transport layer to emit fluorescence even in the configuration having such a undercoat layer. Meanwhile, in cases where depositions exist, UV rays are interrupted by the depositions, do not arrive at the charge transport layer, and no fluorescence is emitted, thus the depositions can be detected.

Accordingly, the observation of the fluctuation caused for the fluorescence may make possible to detect the deposit even of small amounts, regardless of the content of the pigment in the undercoat layer. Here, the deposit is typically of very small amounts and transparent, thus the deposit cannot be distinguished from surface irregularities of the protective layer and the detection is difficult under visual lights such as of dim bulbs and filament lamps.

Sixth Embodiment

In the electrophotographic photoconductors of sixth embodiment, the judgment of usability can be made for the electrophotographic photoconductors by irradiating UV rays with a wavelength of 200 to 420 nm onto the electrophotographic photoconductors and measuring the fluctuation of fluorescence emitted from the electrophotographic photoconductors, since the support has a ten-point average surface roughness (Rz) of 0.8 μm or more and also the charge transport layer is transparent, thus the cutting-processing traces of the support can be observed even thought they are far from distinguishable under visible lights.

In many cases, the supports of the electrophotographic photoconductors are typically produced by cutting processes using lathes. There exist fine convex-concave on the surface of the supports produced by such a process in the circumferential direction. In cases where a charge generating layer is formed on a support having fine convex-concave in the circumferential direction and a charge transport layer is also formed thereon, when the electrophotographic photoconductor is observed from the surface, the charge generating layer and the support can be seen through a transparent charge transport layer. There can be seen slight streaks on the support. In such a case also, it is difficult to find toner filmings occurred on the surface of the electrophotographic photoconductors in their circumferential direction.

Figure 17A:
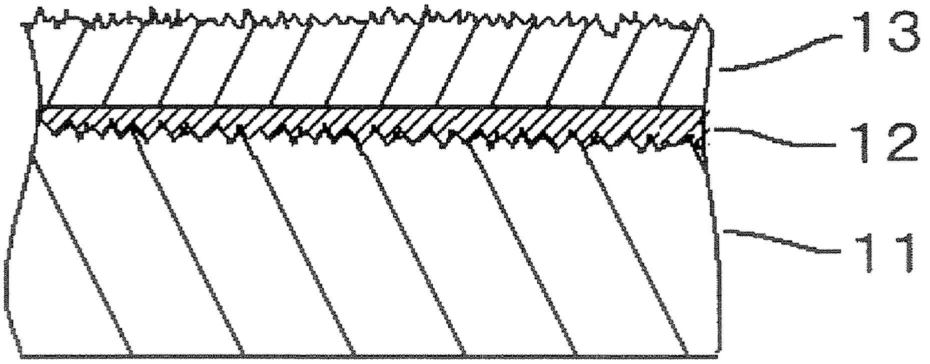
FIG. 17A is a schematic cross-section that illustrates exemplarily an electrophotographic photoconductor.

FIG. 17A shows an example of a used electrophotographic photoconductor including a support 11, the ten-point average surface roughness (Rz) is 0.8 μm or more since the surface was subjected to cutting operation. There exist a charge generating layer 12 and a charge transport layer 13.

When deposits 50 such as toner filmings are adhered on the surface of electrophotographic photoconductors, it is difficult to observe and distinguish the deposits from the cutting traces under visual lights since the ten-point average surface roughness (Rz) is 0.8 μm or more and the charge transport layer is transparent.

Figure 17B:
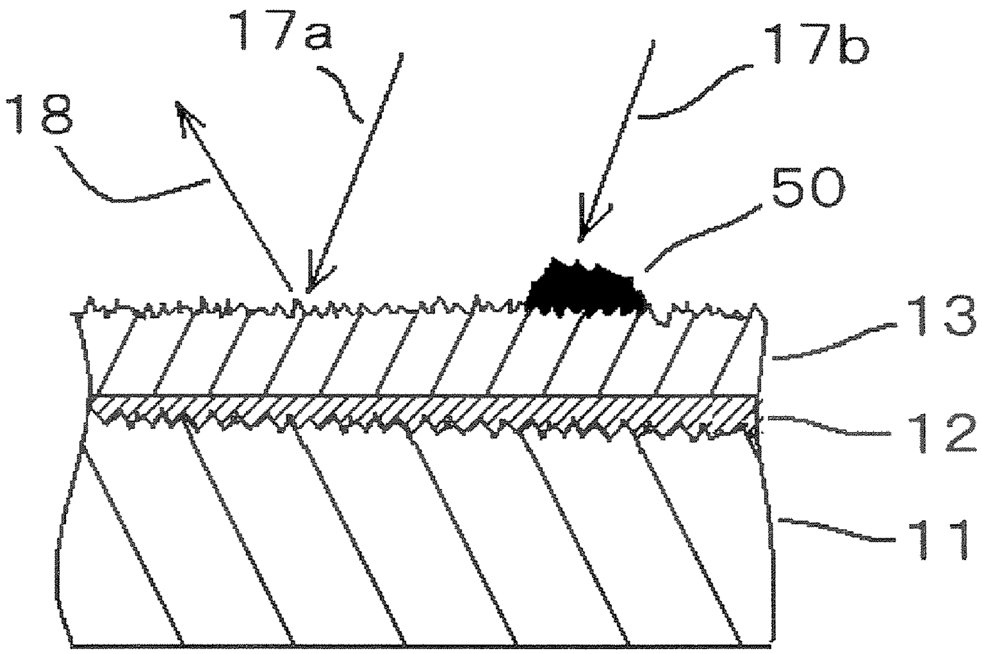
FIG. 17B is a schematic cross-section that illustrates a condition to evaluate the electrophotographic photoconductor shown in FIG. 17A.

On the contrary, when UV rays 17*a* are irradiated onto the surface of electrophotographic photoconductors as shown in FIG. 17B, the UV rays arrived at the charge transport layer 13 through a path with no deposit cause to emit fluorescence 18 from a charge transport substance in the charge transport layer. However, the UV rays 17*b* are interrupted by a deposit 50 on the path, thus do not arrive at the charge transport layer 13 and no fluorescence is emitted.

Accordingly, the observation of the fluctuation caused for the fluorescence 18 may make possible to detect the deposit 50 even of small amounts, regardless of the surface condition of the support 11. Here, the deposit 50 is typically of very small amounts and transparent, thus the deposit 50 cannot be distinguished from surface irregularities of the charge transport layer 13 and the detection is difficult under visual lights such as of dim bulbs and filament lamps.

Here, FIGS. 17A and 17B shows a layer construction of electrophotographic photoconductors with no protective layer, and similar effects are derived in terms of layer constructions with protective layers. In addition, the effects of the present invention can be obtained with respect to unused electrophotographic photoconductors with no flaws or streaks, although 17A and 17B show an electrophotographic photoconductor, in which the surface of the charge transport layer 13 has a number of streaks in the course of forming images.

Image Forming Method And Image Forming Apparatus

The image forming apparatuses according to the present invention contain at least an electrophotographic photoconductor, an electrostatic latent image forming unit, a developing unit, a transferring unit and a fixing unit, and it further contains other units appropriately selected as required such as discharging unit, cleaning unit, recycling unit and controlling unit.

The image forming methods according to the present invention contain at least an electrostatic latent image forming step, a developing step, a transferring step and a fixing step, and optionally other steps appropriately selected as required such as a discharging step, cleaning step, recycling step and controlling step.

The image forming methods according to the present invention may be favorably performed using the image forming apparatuses according to the present invention. The electrostatic latent image forming step may be performed by the electrostatic latent image forming unit, the developing step may be performed by the developing unit, the transferring step may be performed by the transferring unit, the fixing step may be performed by the fixing unit, and the other steps may be performed by the other units.

Electrostatic Latent Image Forming Step And Electrostatic Latent Image Forming Unit In the electrostatic latent image forming step, electrostatic latent images are formed on an electrophotographic photoconductor. The electrophotographic photoconductor may be those evaluated to be reusable in accordance with the inventive method for reusing electrophotographic photoconductors. The electrostatic latent images may be formed, for example, by charging uniformly the surface of the electrophotographic photoconductor followed by imagewisely exposing it, which may be performed by the electrostatic latent image forming unit described above. The electrostatic latent image forming unit comprises at least a charger that uniformly charges the surface of the electrophotographic photoconductor and an exposing device that exposes imagewisely the surface.

The charging may be performed, for example, by applying an electric potential on the surface of the electrophotographic photoconductor with the charger.

The charger may be properly selected depending on the application; examples thereof include conventional contact-charging devices equipped with a conductive or semiconductive roller, brush, film and rubber blade; and noncontact-charging devices utilizing corona discharge such as corotrons and scorotrons.

The configuration of the charging devices may properly selected depending on the specification or configuration of image forming apparatuses, for example may be magnetic brushes, fur brushes other than rollers. In cases of the magnetic brushes, these are constructed from a charging member of various ferrite particles such as Zn—Cu ferrite, a nonmagnetic conductive sleeve for supporting the charging member, and a magnet roller included in the sleeve. In cases of the fur brushes, a conduction-processed fur with carbon, copper sulfate, metal or metal oxide for conductivity is used as a material for the fur brush, and a charging device is formed by wrapping or pasting the fur on a metal shaft or a conduction-processed shaft.

The contact-charging devices are preferable since the resulting image forming apparatuses are favorably suppressed for ozone generated at the charging devices, but not limited absolutely to the contact charging units described above.

It is preferable that the charging devices are placed in contact with or not in contact with the electrophotographic photoconductor and that a direct and alternating voltages are superimposed and applied to the charge roller to electrify the surface of the electrophotographic photoconductor.

It is preferable that the charging device is a charge roller which is allocated near but without contacting the electrophotographic photoconductor through a gap tape and that a direct and alternating voltages are superimposed and applied to the charge roller to electrify the surface of the electrophotographic photoconductor.

The exposure may be performed, for example, by exposing imagewisely the surface of the electrophotographic photoconductor with the exposing device. The exposing device may be properly selected as long as capable of imagewisely exposing on the surface of the electrophotographic photoconductor charged by the charging device. Examples of the exposing device include copying optical systems, rod lens array systems, laser optical systems and liquid crystal shutter optical systems.

In the present invention, the back-exposure method may be adopted in which the electrophotographic photoconductor is exposed imagewisely from the back side.

Developing Step And Developing Unit

In the developing step, visual images are formed by developing electrostatic latent images using toners or developers. The visible images may be formed by developing the electrostatic latent image using toners or developers, and the step may be performed by the developing unit.

The developing unit may be properly selected as long as capable of developing using toners or the developers, and may be appropriately selected from conventional ones. For example, a preferable developing unit contains a toner or developer and includes a developing device which can impart the toner or the developer in a contact or noncontact manner to an electrostatic latent image.

The developing device may be of dry-type or wet-type, and may also be of monochrome or multi-color. As a preferable example, the developing device has an agitator that frictions and agitates the toner or developer for electrification and a rotatable magnet roller.

In the developing device, for example, the toner and the carrier are mixed and agitated, which causes a friction to charge the toner and maintains the charged toner on the surface of the rotating magnet roller in a state of a chain of magnetic particles, and a magnetic brush is formed. The magnet roller is arranged near the electrophotographic photoconductor, i.e. photoconductor; therefore, a part of the toner constituting the magnetic brush formed on the surface of the magnetic roller transfers to the surface of the electrophotographic photoconductor, i.e. photoconductor, due to electric attraction. As a result, the electrostatic latent image is developed by the toner, and a visible image by the toner is formed on the surface of the electrophotographic photoconductor, i.e. photoconductor.

The developer contained in the developing device may be of one-component or two-component.

Transferring Step And Transferring Unit

In the transferring step, the visible images are transferred to a recording medium. It is preferred that the transferring step is carried out in such a way that the visible images are primary-transferred on an intermediate recording medium, then the visible images are secondary-transferred from the intermediate recording medium to the recording medium; it is more preferred that toners of two or more colors, preferably full-color toners are employed, and the transferring step is carried out by way of the first transfer step in which visual images are transferred on the intermediate recording medium to form complex transferred images and the second transfer step in which the complex transferred images are transferred to the recording medium.

The transfer of the visible images may be performed by charging the electrophotographic photoconductor using a transfer-charging device, and may be performed by the transferring unit. The transferring unit preferably includes a primary transferring unit that transfers visible images to an intermediate recording medium to form complex transferred images and a secondary transferring unit that transfers the complex transferred images to the recording medium.

The intermediate recording medium may be properly selected depending on the applications from conventional recording media; favorable examples include a transfer belt.

The transferring unit, i.e. the primary transferring unit and the secondary transferring unit, preferably contain at least a transferring device that strips and charges the visible images formed on the electrophotographic photoconductor to the side of the recording medium. The transferring unit may exist one or plural.

Examples of the transferring device include corona transferring devices on the basis of corona discharge, transfer belts, transfer rollers, pressure transfer rollers and adhesive transferring devices.

Also, the typical recording medium is plain paper, but is not limited to as long as capable of transferring unfixed images after developing; PET bases for OHP may also be employed.

Fixing Step And Fixing Unit

The fixing unit may be properly selected depending on the application; conventional heating-pressing devices are favorably employed in general. Examples of the heating-pressing devices include a combination of heat rollers and pressure rollers and a combination of heat rollers, pressure rollers and endless belts.

In general, the heating by the hot-pressing devices is preferably carried out at 80° C. to 200° C. In the present invention, conventional optical fixing devices, for example, may be used along with or in place of the fixing step or the fixing devices according to applications.

Other Step And Other Device

In the discharging step, the electrophotographic photoconductor is discharged by applying a discharging bias, and the step may be favorably performed by a discharging device.

The discharging device may be properly selected from conventional discharging devices as long as the discharging bias is applied to the electrophotographic photoconductor; examples thereof include discharge lamps.

In the cleaning step, toners remaining on the electrophotographic photoconductors are removed, which may be favorably performed by cleaning devices.

The cleaning devices may be properly selected from conventional cleaners as long as capable of removing the toner of the electrophotographic photoconductors; examples thereof include magnetic brush cleaners, static brush cleaners, magnetic roller cleaners, blade cleaners, brush cleaners and web cleaners.

In the recycling step, the toners removed in the cleaning step are recycled into the developing unit, which may be appropriately carried out by recycling devices. The recycling may be, for example, conventional conveying devices.

In the controlling step, the steps described above are controlled, which may be appropriately carried out by recycling devices. The controlling means may be properly selected as long as capable of controlling the units described above; examples thereof include equipments or instruments such as sequencers and computers.

Figure 18:
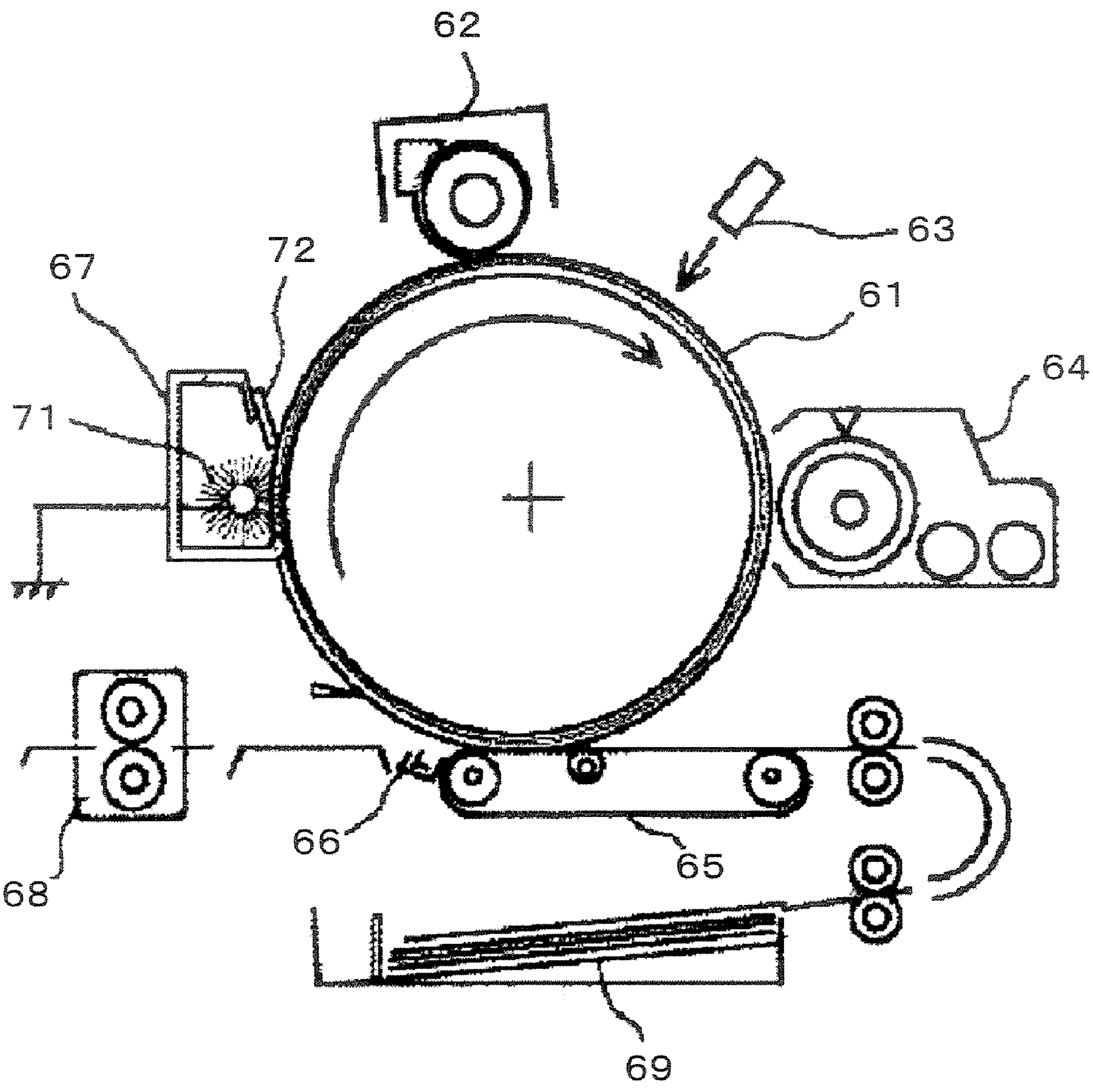
FIG. 18 is a schematic view that illustrates exemplarily an image forming apparatus according to the present invention.

An embodiment of the inventive image forming methods by use of the inventive image forming apparatuses will be explained with reference to figures. FIG. 18 illustrates schematically an exemplary image forming apparatus according to the present invention.

This image forming apparatus is equipped with the electrophotographic photoconductor 61 at its central area, which having been evaluated to be usable in accordance with the inventive method for reusing electrophotographic photoconductors, and also a charging device 62, exposure device 63, developing device 64, transferring device 65, cleaning device 67 and fixing device 68.

The charging device 62, which being provided for charging the electrophotographic photoconductor 61, may be of contact-charging, no-contact charging or corona-charging type.

The exposure device 63 reads the original copy by a charge coupling device (CCD) and is equipped with an LD element or LED array as the light source for forming electrostatic contrasts of electrostatic latent images on the charged photoconductor.

The developing device 64, which utilizes a magnetic toner of one-component developer or a developer of two-component developer containing a toner and a carrier, is of magnetic brush that is applied a bias.

The transferring device 65 acts to transfer toner images through being applied a voltage of inverse polarity with the toner for transferring toner images on the photoconductor on copy papers.

The cleaning device 67 is constructed from a cleaning blade 72 itself or further combined with a cleaning brush 71 of straight or loop hairs in order to clean the residual powder on the photoconductor.

A heater is provided with the fixing device 68 in order to produce hardcopies of toner images. In FIG. 18, there exist a recording medium 69 and a separating device 66 for electrostatically separating the electrophotographic photoconductor 61 and the recording medium 69.

The electrophotographic photoconductor 61 of drum-shape is driven to rotate in the arrow direction as shown in FIG. 18, and the surface of the photoconductor 61 is charged uniformly by the charging device 62 during the rotation. The charged surface is subjected to image exposure or optical writing at the site of exposure device 63 thereby to form certain electrostatic latent images on the photoconductor surface.

The electrostatic latent images are visualized into toner images by the developing device 64, and the toner images are transfer onto recording media such as plain papers by action of the transferring device 65. After this transfer, residual toners are deposited on the surface of the photoconductor 61, thus the residual toners are scraped and removed from the surface by a cleaning brush 71 or cleaning blade 72 in the cleaning device 67. These actions are repeatedly carried out sequentially.

Here, "filming substance" will be formed on the photoconductor 61 during the repeated actions for image forming or copy actions. The "filming substance" will be accumulated with time, the accumulation tends to gradually degrade the image quality, and the photoconductor comes to be exchanged. In such cases, usable photoconductors can be reused through evaluating the usability of the used photoconductors by the inventive method for evaluating the usability, which contributing the source saving and energy saving.

Process Cartridge

The process cartridge according to the present invention comprises an electrophotographic photoconductor, which having been evaluated to be usable in accordance with the inventive method for reusing electrophotographic photoconductors, and at least one unit selected from a charging unit, developing unit, transfer unit, cleaning unit and discharging unit, and also other optional units selected as required, and can be detachably attached to main bodies of image forming apparatuses.

Figure 19:
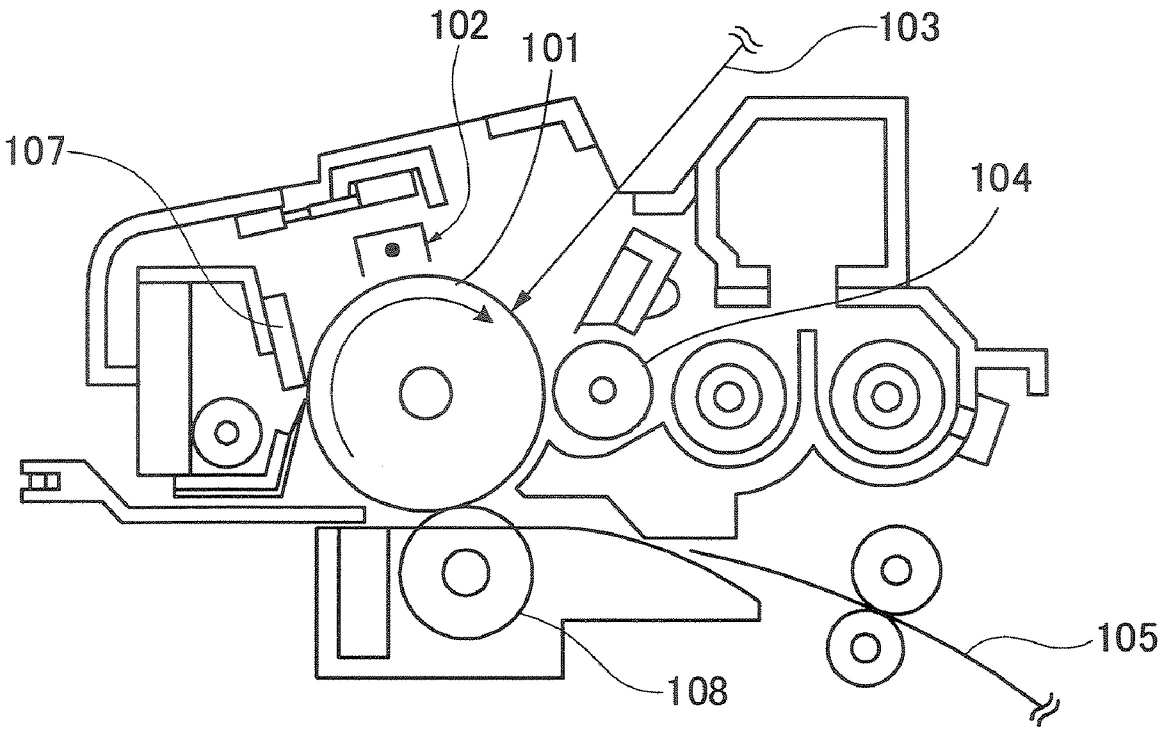
FIG. 19 is a schematic view that illustrates exemplarily a process cartridge according to the present invention.

The process cartridge, as shown in FIG. 19, houses an electrophotographic photoconductor 101, and includes also at least one selected from a charging device 102, developing device 104, transferring device 106, cleaning device 107 and a discharging device (not shown), and can be detachably attached to the main bodies of image forming apparatuses.

An image forming process by means of the process cartridge shown in FIG. 19 will be explained below. An electrostatic latent image corresponding to an exposure image is formed on the surface of the photoconductor 101, which is rotating in the direction of the arrow, by the charge from the charging unit 102 and exposure 103 from an exposing unit (not shown). This electrostatic latent image is developed in the developing unit 104, and the visual image is transferred to the recording medium 105 by the transferring unit 106. Then, the photoconductor surface, after the image being transferred, is cleaned with the cleaning unit 107 and further discharged by a discharging unit (not shown). The above operations are carried out repeatedly.

The process cartridges, as shown in FIG. 19, are detached from image forming apparatuses, for example, in cases of unusable conditions such as (i) toner is depleted from developing devices, (ii) developing roller becomes dirty, (iii) defects appear at cleaning blades, (iv) waste toner tank comes to fill. Then the detached process cartridge is evaluated with respect to its usability by the inventive method for evaluating the usability, which contributing the source saving and energy saving.

The present invention can solve the problems in the prior art, and provide a method and also a device for evaluating electrophotographic photoconductors that can easily and accurately evaluate initial filmings, slight filmings, or local filmings of 0.5 mm or less wide without being affected by surface conditions of electrophotographic photoconductors.

In addition, a method for reusing electrophotographic photoconductors can be provided that can evaluate easily and accurately the reusability of used electrophotographic photoconductors, select available electrophotographic photoconductors and reuse them efficiently, and thus contributing to resource and energy saving.

The present invention will be explained with reference to Examples in the following, to which the present invention should not be defined at all. In the descriptions below, all parts and % are expressed by mass unless indicated otherwise.

Example 1

Preparation of Electrophotographic Photoconductor

An aluminum alloy cylinder (outside diameter: 30 mm, inside diameter: 28 mm, length: 340 mm, JIS A3100) was degreased and rinsed, to which a coating liquid for undercoat layers of the composition below was coated by a dip-coating process.

Then the coating was heated at 150° C. for 15 minutes to heat-cure, to form an undercoat layer of 3 μm thick on the aluminum alloy support.

Composition of Coating Liquid For Undercoat Layer

| | |
|---|---|
| Titanium oxide | 20 parts |
| Alkyd resin | 10 parts |
| Melamine Resin | 10 parts |
| Methyl ethyl ketone | 60 parts |

A coating liquid for charge generating layers was prepared in the composition below, the coating liquid was coated on the undercoat layer by a dip-coating process, then the coating was dried at 100° C. for 10 minutes to form a charge generating layer of 0.1 μm thick.

Composition of Coating Liquid For Charge Generating Layer

| | |
|---|---|
| Butyral resin (by UCC CO., XYHL) | 1 part |
| Disazo compound[1)] | 9 parts |
| [1)]expresses by the structural formula blow | |
| 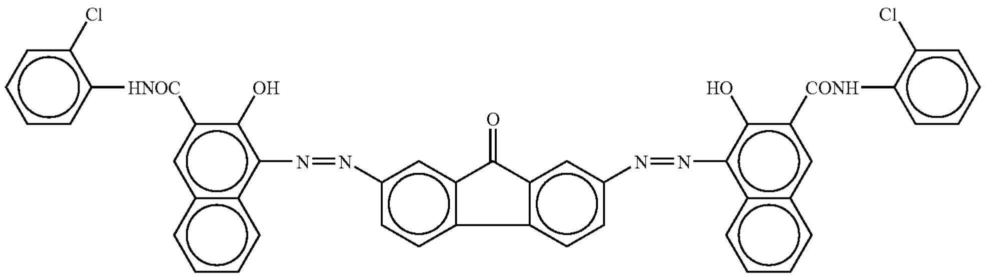 | |
| Cyclohexane | 30 parts |
| Tetrahydrofuran (TUF) | 30 parts |

A coating liquid for charge transport layers was prepared in the composition below, the coating liquid was coated on the charge generating layer by a dip-coating process, then the coating was dried at 120° C. for 15 minutes to form a charge transport layer of 22 μm thick.

Composition of Coating Liquid For Charge Transport Layer

| | |
|---|---|
| Polycarbonate Resin[1)] (by UCC CO, XYHL) | 10 parts |
| [1)]TS2050, by Teijin Chemicals Ltd., viscosity average molecular weight: 50,000 | |
| Charge Transport Substance[2)] | 10 parts |
| [2)]expressed by the structural formula blow; emit fluorescence upon irradiating UV rays having a wavelength of 200 to 420 nm | |
| 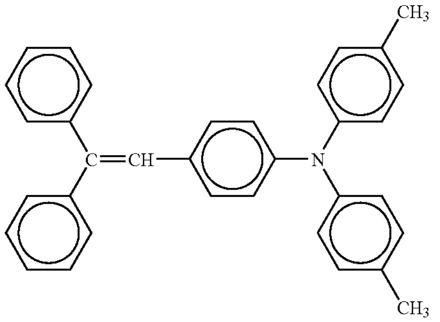 | |
| Tetrahydrofuran (THF) | 80 parts |

Image Formation And Filming Evaluation

Flanges were attached to both ends of the resulting electrophotographic photoconductor, then these were mounted to an image forming apparatus (by Ricoh Company, Ltd., IPSiO Color 8000), and A4 size images were printed on 3000 sheets.

The electrophotographic photoconductor after use was taken out from the image forming apparatus, and attached to the evaluation device shown in FIG. 4 disposed in a darkroom. UV rays having a wavelength of 254 nm were irradiated onto the electrophotographic photoconductor under no illumination, and fluorescence emitted from the electrophotographic photoconductor was visually observed, consequently filmings could be definitely observed.

In the Example 1, the UV ray source was Compact UV Lamp UVG-15 (by UVP Co., USA), and the distance between the UV ray source and the electrophotographic photoconductor was 15 cm.

Comparative Example 1

An electrophotographic photoconductor was prepared in the same manner as Example 1, then A4 size images were printed on 3000 sheets using the photoconductor.

The electrophotographic photoconductor after the printing was taken out from the image forming apparatus, and the surface of the electrophotographic photoconductor was observed visually under fluorescent illumination. Consequently, it was difficult to confirm filmings since the degree of the filming generation was very slight.

Example 2

An electrophotographic photoconductor was prepared in the same manner as Example 1, then A4 size images were printed on 3000 sheets using the photoconductor.

Figure 13:
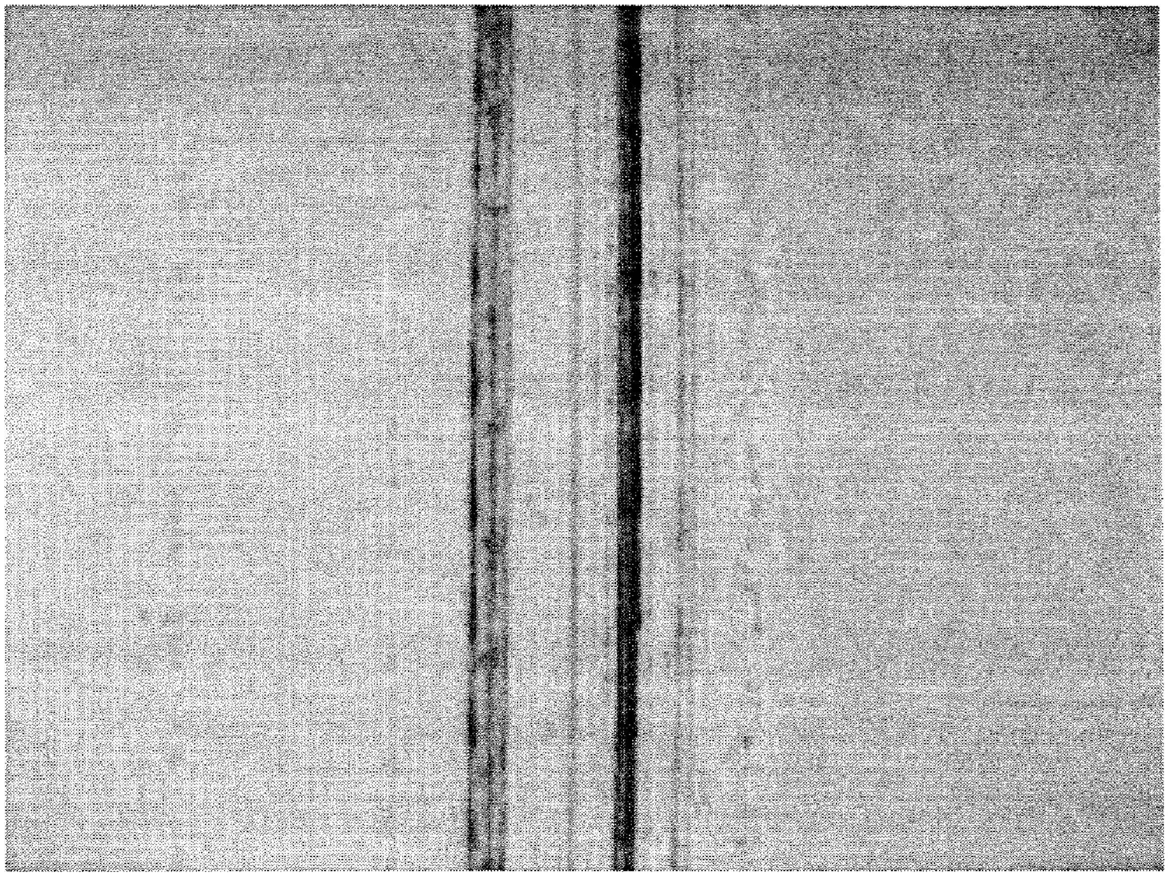
FIG. 13 is a photograph that shows a filming condition observed in Example 2.

The electrophotographic photoconductor after the printing was taken out from the image forming apparatus, and attached to the evaluation device shown in FIG. 5 disposed in a darkroom. UV rays having a wavelength of 254 nm were irradiated from Compact UV Lamp UVG-15 (by UVP Co., USA) and the fluorescence emitted from the electrophotographic photoconductor was photographed by a digital camera (by Ricoh Company, Ltd., Caplio G3). The results are shown in FIG. 13. Here, the original image of FIG. 13 is a color image of green, the image of FIG. 13 is represented after transforming into a monochrome image.

Figure 14:
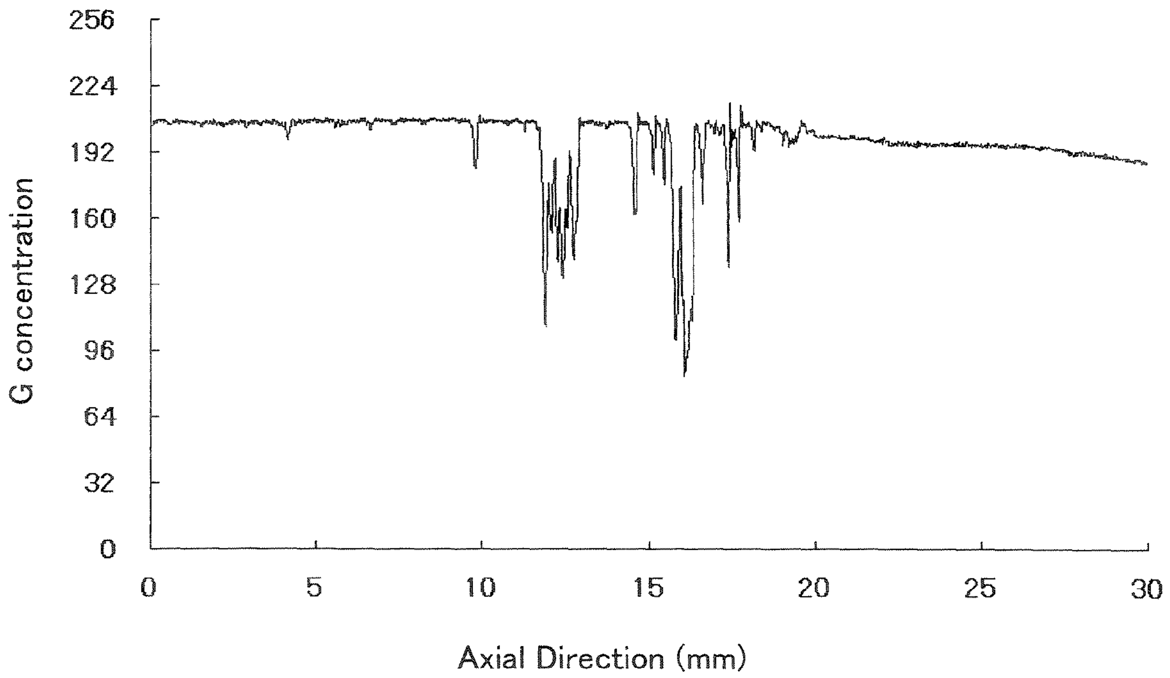
FIG. 14 is a graph in which the filming condition in Example 2 is digitized in a crosswise direction.

The traverse direction of FIG. 13 corresponds to 30 mm length of the electrophotographic photoconductor in its axial direction. FIG. 14 is a graph that shows the change of image densities of FIG. 13 in terms of 256 steps. From the results of FIGS. 13 and 14, it is understood that the condition of filming generation can be precisely observed.

Example 3

An electrophotographic photoconductor was prepared in the same manner as Example 1, except that the charge transport substance in the coating liquid of the charge transport layer was changed into the charge transport substance that emits fluorescence upon being irradiated UV rays having a wavelength of 200 to 420 nm expressed by the structural formula below.

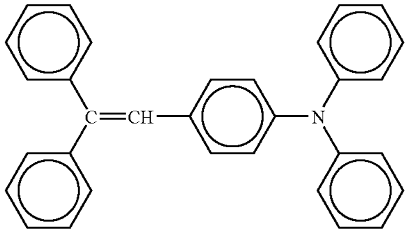

The resulting electrophotographic photoconductor was mounted to an image forming apparatus (by Ricoh Company, Ltd., IPSiO Color 8000), and A4 size images were printed on 3000 sheets in the same manner as Example 1.

The electrophotographic photoconductor after use was taken out from the image forming apparatus, and attached to the evaluation device shown in FIG. 4 disposed in a darkroom. UV rays having a wavelength of 254 nm were irradiated onto the electrophotographic photoconductor under no illumination, and fluorescence emitted from the electrophotographic photoconductor was observed, consequently filmings could be definitely observed.

In the Example 3, the UV ray source was Compact UV Lamp UVG-15 (by UVP Co., USA), and the distance between the UV ray source and the electrophotographic photoconductor was 15 cm.

Comparative Example 2

An electrophotographic photoconductor was prepared in the same manner as Example 1, then A4 size images were printed on 3000 sheets using the photoconductor.

The electrophotographic photoconductor after the printing was taken out from the image forming apparatus, and the surface of the electrophotographic photoconductor was observed visually under fluorescent illumination. Consequently, it was difficult to confirm filmings since the degree of the filming generation was very slight.

Example 4

The coating liquid for protective layers of the composition below was spray-coated on the surface of the electrophotographic photoconductor prepared in Example 1, then the coating was dried at 120° C. for 20 minutes to prepare a protective layer of 3 μm thick.

Composition of Coating Liquid For Protective Layer

| | |
|---|---|
| Polycarbonate Resin[1)] (by UCC CO. XYHL) | 10 parts |
| [1)]TS2050, by Teijin Chemicals Ltd. viscosity average molecular weight: 50,000 | |
| Charge Transport Substance[2)] | 7 parts |
| [2)]expressed by the structural formula blow; emit fluorescence upon irradiating UV rays having a wavelength of 200 to 420 nm | |
| 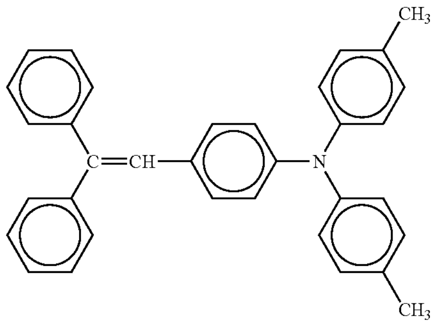 | |
| Alumina Fine Particles[3)] | 4 parts |
| [3)]specific resistance: $2.5 \times 10^{12}$ ohms · cm, average primary particle size 0.4 μm | |
| Cyclohexanone | 500 parts |
| Tetrahydrofuran | 150 parts |

Image Formation And Filming Evaluation

The resulting electrophotographic photoconductor was mounted to an image forming apparatus (by Ricoh Company, Ltd., IPSiO Color 8000), and A4 size images were printed on 3000 sheets.

The electrophotographic photoconductor after the printing was taken out from the image forming apparatus, and attached to the evaluation device shown in FIG. 4 disposed in a darkroom. UV rays having a wavelength of 365 nm were irradiated onto the electrophotographic photoconductor under no illumination, and fluorescence emitted from the electrophotographic photoconductor was observed, consequently filmings could be definitely observed.

In the Example 4, the UV ray source was Compact UV Lamp UVG-15 (by UVP Co., USA), and the distance between the UV ray source and the electrophotographic photoconductor was 15 cm.

Comparative Example 3

An electrophotographic photoconductor was prepared in the same manner as Example 4, then A4 size images were printed on 3000 sheets using the photoconductor.

The electrophotographic photoconductor after the printing was taken out from the image forming apparatus, and the surface of the electrophotographic photoconductor was observed visually under fluorescent illumination. Consequently, it was difficult to confirm filmings since the degree of the filming generation was very slight.

Example 5

An electrophotographic photoconductor was prepared in the same manner as Example 1, then A4 size images were printed on 3000 sheets using the photoconductor.

The electrophotographic photoconductor after the printing was taken out from the image forming apparatus, and mounted to the evaluation device shown in FIG. 6 disposed in a darkroom, then filmings were observed.

In Example 5, the UV ray source 7*a* was a LED of OSS5111A (by OptoSupply Co. Ltd., peak wavelength: 400 nm) and the light receiving element was phototransistor TPS601A (by Toshiba Co.).

The UV ray source 7*a* and the light receiving element 8*a* were moved along the axial direction of the electrophotographic photoconductor at a velocity of 20 mm/sec, and the light amount received by the light receiving element 8*a* was measured.

Consequently, it was confirmed from visual inspection that the received light amounts are lower at the regions where filmings exist and larger at the regions where no or little filmings exist, thus the filming occurrence can be detected.

Example 6

Preparation of Electrophotographic Photoconductor

An aluminum cylinder of 30.5 mm diameter by 340 mm long produced by a drawing process was worked by cutting the surface to produce an aluminum support of 30 mm outer diameter by 28.5 mm inner diameter by 340 mm long with a ten-point average surface roughness (Rz) of 1.1 μm.

Then a coating liquid for undercoat layers of the composition below was prepared, the aluminum support described above was dip-coated with the coating liquid, and the coating was dried at 120° C. for 20 minutes to form an undercoat layer of 3.0 μm thick.

Composition of Coating Liquid For Undercoat Layer

| | |
|---|---|
| Alkyd resin (Beckosol 1307-60-EL)[1)] | 6 parts |
| Melamine Resin (Super Beckamine G-821-60)[2)] | 4 parts |
| Titanium oxide | 40 parts |
| Methyl ethyl ketone | 200 parts |

[1)]by Dainippon Ink and Chemicals Inc.
[2)]by Dainippon Ink and Chemicals Inc.

The coating liquid for charge generating layers of the composition below, of which the average particle size of the pigment having been adjusted to 0.2 μm through a dispersion by beads milling, was poured into a dip-coating device to coat the aluminum support. Then the coating was dried at 80° C. for 20 minutes to form a charge generating layer of 0.2 μm thick.

Composition of Coating Liquid For Charge Generating Layer

| | |
|---|---|
| Y-form Titanyl phthalocyanine | 15 parts |
| Polyvinyl Butyral | 10 parts |
| Methyl ethyl ketone | 600 parts |

Subsequently, the coating liquid for charge transport layers of the composition below was coated on the charge generating layer, the coating wad dried at 130° C. for 20 minutes to form a charge transport layer of 25 μm thick thereby to prepare an electrophotographic photoconductor.

Composition of Coating Liquid For Charge Transport Layer

| | |
|---|---|
| Z-type Polycarbonate Resin | 10 parts |
| Charge Transport Substance[1)] | 8 parts |
| [1)]expressed by the structural formula blow; emit fluorescence upon irradiating UV rays having a wavelength of 200 to 420 nm | |
| Tetrahydrofuran | 80 parts |

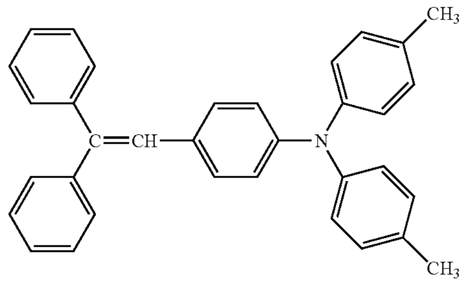

Evaluation

Flanges were attached to both ends of the resulting electrophotographic photoconductor, then these were mounted to an image forming apparatus (by Ricoh Company, Ltd., IPSiO Color 8000), and printings of successive 100 sheets were repeated 50 times thereby to cause filmings on the electrophotographic photoconductor. The ten-point average surface roughness (Rz) was 1.3 μm for the electrophotographic photoconductor after the printing in accordance with JIS B0601-1994.

The electrophotographic photoconductor after the printing was detached from the image forming apparatus (by Ricoh Company, Ltd., IPSiO Color 8000) and attached to the evaluation device shown in FIG. 7 in a darkroom. A UV rays having a peak wavelength of 400 nm was irradiated onto the electrophotographic photoconductor rotating at 120 rpm by disposing a UV LED (by OptoSupply Co., OSSV5111A) at the distance of 5 cm from the surface of the electrophotographic photoconductor. During this irradiation, the UV LED was applied 20 mA through inserting a current-limiting resistance into a low voltage line of DC 5V. A light-receiving element of Si photodiode S7686 (by Hamamatsu Photonics K.K.) was attached such that the fluorescence from the electrophotographic photoconductor irradiates the light-receiving element, the UV LED and the Si photodiode were moved from the left end to the right end at a velocity of 2 mm/sec, and the irradiation was measured by the Si photodiode. The signals measured by the Si photodiode were examined in terms of the change through amplifying by an operational amplifier; as a result, signal changes were recognized at the sites of 57 mm and 95 mm from the left end. The sites of the electrophotographic photoconductor, at which the signal changes being recognized, were observed in detail by means of an optical microscope, consequently, the existence of filmings was confirmed. The irradiation period of the UV rays in Example 6 was 5 seconds per irradiation at one site.

Example 7

Preparation of Electrophotographic Photoconductor

An aluminum cylinder of 30.5 mm diameter by 270 mm long produced by a drawing process was worked by cutting the surface to produce an aluminum support of 30 mm outer diameter by 28.5 mm inner diameter by 270 mm long with a ten-point average surface roughness (Rz) of 1.1 μm.

The coating liquid for charge generating layers of the composition below, of which the average particle size of the pigment having been adjusted to 0.2 μm through a dispersion by beads milling, was poured into a dip-coating device to coat the aluminum support. Subsequently, the coating liquid was coated and dried at 80° C. for 20 minutes to form a charge generating layer of 0.2 μm thick.

Composition of Coating Liquid For Charge Generating Layer

| | |
|---|---|
| Y-form Titanyl phthalocyanine | 15 parts |
| Polyvinyl Butyral | 10 parts |
| Methyl ethyl ketone | 600 parts |

Subsequently, the coating liquid for charge transport layers of the composition below was coated on the charge generating layer, the coating wad dried at 130° C. for 20 minutes to form an charge transport layer of 25 μm thick thereby to prepare an electrophotographic photoconductor.

Composition of Coating Liquid For Charge Transport Layer

| | |
|---|---|
| Z-type Polycarbonate Resin | 10 parts |
| Charge Transport Substance[1)] | 8 parts |
| [1)]expressed by the structural formula blow; emit fluorescence upon irradiating UV rays having a wavelength of 200 to 420 nm | |
| Tetrahydrofuran | 80 parts |

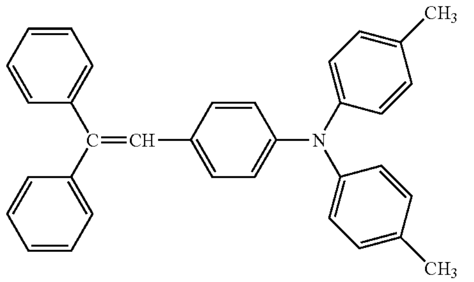

Evaluation

Flanges were attached to both ends of the resulting electrophotographic photoconductor, then these were mounted to an image forming apparatus (by Ricoh Company, Ltd., IPSiO Color 8000), and printings of successive 100 sheets were repeated 50 times thereby to cause filmings on the electrophotographic photoconductor. The ten-point average surface roughness (Rz) was 1.3 μm for the electrophotographic photoconductor after the printing in accordance with JIS B0601-1994.

The electrophotographic photoconductor was detached from the image forming apparatus (by Ricoh Company, Ltd., IPSiO Color 8000) and attached to the evaluation device shown in FIG. 7 in a darkroom. A UV rays having a peak wavelength of 400 nm was irradiated to the electrophotographic photoconductor rotating at 120 rpm by disposing a UV LED (by OptoSupply Co., OSSV5111A) at the distance of 5 cm from the surface of the electrophotographic photoconductor. During this irradiation, the UV LED was applied 20 mA through inserting a current-limiting resistance into a low voltage line of DC 5V. A light-receiving element of Si photodiode S7686 (by Hamamatsu Photonics K.K.) was attached such that the fluorescence from the electrophotographic photoconductor irradiates the light-receiving element, the UV LED and the Si photodiode were moved from the left end to the right end at a velocity of 2 mm/sec, and the irradiation was measured by the Si photodiode. The signals measured by the Si photodiode were examined in terms of the change through amplifying by an operational amplifier; as a result, signal changes were recognized at the sites of 75 mm and 175 mm from the left end. The sites of the electrophotographic photoconductor, at which the signal changes being recognized, were observed in detail by means of an optical microscope, consequently, the existence of filmings was confirmed. The irradiation period of the UV rays in Example was 5 seconds per irradiation at one site.

Example 8

Preparation And Evaluation of Electrophotographic Photoconductor

An electrophotographic photoconductor was prepared in the same manner as Example 6, and printings of successive 100 sheets were repeated 50 times thereby to cause filmings on the electrophotographic photoconductor.

The electrophotographic photoconductor after the printing was detached from the image forming apparatus (by Ricoh Company, Ltd., IPSiO Color 8000) and the surface was observed through irradiating UV rays of wavelength 254 nm using a UV lamp (by Topcon Co., model FI-5S) from a distance of 15 cm. Consequently, fluorescence was emitted from the entire photoconductor, in particular, two spots of navy to black were observed at the sites of 57 mm and 95 mm from the left end. These were substantially the same filmings as those detected in Example 6. The period of irradiating the UV rays was 10 seconds in total.

Example 9

Preparation And Evaluation of Electrophotographic Photoconductor

An electrophotographic photoconductor was prepared in the same manner as Example 6, and printings of successive 100 sheets were repeated 50 times thereby to cause filmings on the electrophotographic photoconductor.

Figure 20:
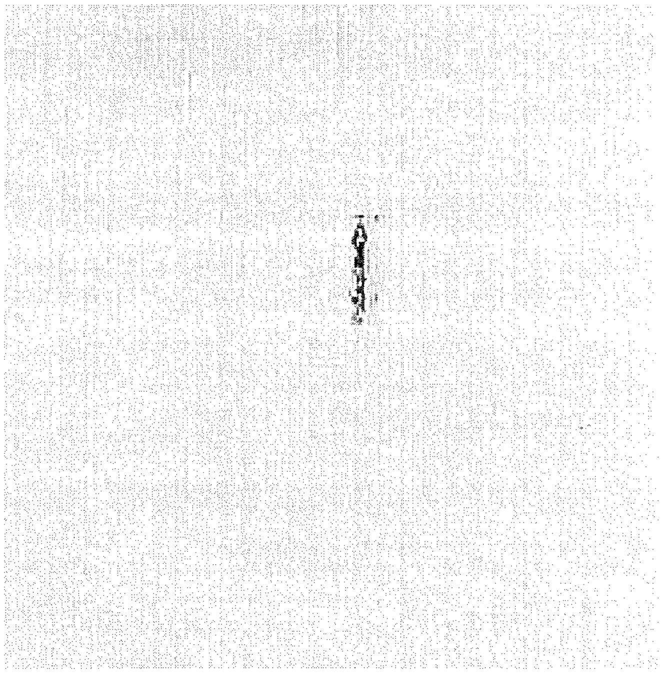
FIG. 20 is a photograph that illustrates a filming condition observed in Example 9.
Figure 21:
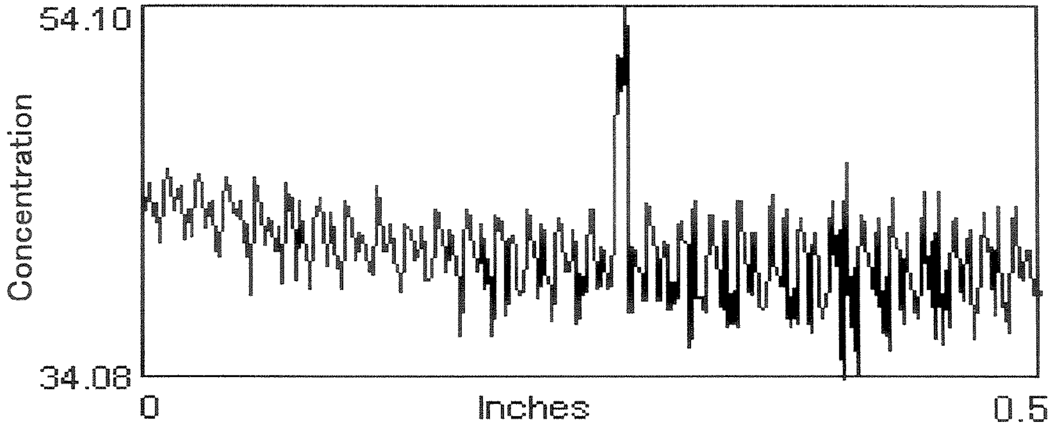
FIG. 21 is a graph in which the filming condition in Example 9 is digitized.

The electrophotographic photoconductor after the printing was detached from the image forming apparatus (by Ricoh Company, Ltd., IPSiO Color 8000) and the surface was photographed by a CCD camera through irradiating UV rays of wavelength 254 nm using a UV lamp (by Topcon Co., model FI-5S) from a distance of 15 cm. The images photographed by the CCD camera were input into a personal computer and enhanced in terms of the profiles, consequently, density change was detected at two sites of 57 mm and 95 mm from the left edge. The density change at 57 mm from the left edge is shown in FIG. 20. The density measurement of the image in FIG. 20 in the traverse direction is shown in FIG. 21. In the FIGS. 20 and 21, the vertical and traverse sizes are each 12.7 mm. The period of irradiating the UV rays was 10 seconds in total.

Comparative Example 4

Preparation And Evaluation of Electrophotographic Photoconductor

An electrophotographic photoconductor was prepared in the same manner as Example 6, and printings of successive 100 sheets were repeated 50 times thereby to cause filmings on the electrophotographic photoconductor.

The electrophotographic photoconductor after the printing was detached from the image forming apparatus (by Ricoh Company, Ltd., IPSiO Color 8000) and the surface was inspected visually for 2 minutes under a dim bulb of daylight color (by Hitachi Ltd., high white FL15N-B) at 30 cm underneath of the bulb; however, no filming could be found.

Comparative Example 5

Preparation And Evaluation of Electrophotographic Photoconductor

An electrophotographic photoconductor was prepared in the same manner as Example 7, and printings of successive 100 sheets were repeated 50 times thereby to cause filmings on the electrophotographic photoconductor.

The electrophotographic photoconductor after the printing was detached from the image forming apparatus (by Ricoh Company, Ltd., IPSiO Color 8000) and the surface was inspected visually for 2 minutes under a dim bulb of daylight color (by Hitachi Ltd., high white FL15N-B) at 30 cm underneath of the bulb; however, no filming could be found.

The inventive method for evaluating electrophotographic photoconductors and the inventive device for evaluating electrophotographic photoconductors can easily and accurately evaluate initial filmings, slight filmings, or local filmings of 0.5 mm or less wide that could not be detected by conventional methods for evaluating filmings, thus can be appropriately utilized for evaluating filming occurrence on electrophotographic photoconductors.

The inventive method for reusing electrophotographic photoconductors can evaluate easily and accurately the reusability of used electrophotographic photoconductors, select available electrophotographic photoconductors and reuse them efficiently into process cartridges or image forming apparatuses.

What is claimed is:

1. A method for evaluating an electrophotographic photoconductor in terms of filming occurrence, the electrophotographic photoconductor having an outermost layer comprising a charge transport substance which emits fluorescence upon irradiation of UV rays in an amount of 30% by mass or more, comprising:

irradiating UV rays having a wavelength of 200 nm to 420 nm onto the electrophotographic photoconductor, and measuring fluorescence emitted from the charge transport substance in the outermost layer of the electrophotographic photoconductor.

2. The method for evaluating an electrophotographic photoconductor according to claim 1, wherein the fluorescence emitted from the electrophotographic photoconductor is measured by visual observation.

3. The method for evaluating an electrophotographic photoconductor according to claim 1, wherein the fluorescence emitted from the electrophotographic photoconductor is measured by observing an image received into an image receiving unit.

4. The method for evaluating an electrophotographic photoconductor according to claim 3, wherein the received image is image-processed.

5. The method for evaluating an electrophotographic photoconductor according to claim 1, wherein the fluorescence emitted from the electrophotographic photoconductor is measured by detecting the fluorescence by use of a light receiving element sensitive to the wavelength of the fluorescence.

6. The method for evaluating an electrophotographic photoconductor according to claim 1, wherein illumination intensity of UV rays is 100 $\mu W/cm^2$ to 1000 $\mu W/cm^2$ on the surface of the electrophotographic photoconductor.

7. The method for evaluating an electrophotographic photoconductor according to claim 1, wherein the irradiation period of UV rays is one minute or less per irradiation at one time.

8. The method for evaluating an electrophotographic photoconductor according to claim 1, wherein the electrophotographic photoconductor is mounted in a process cartridge.

9. A device for evaluating an electrophotographic photoconductor in terms of filming occurrence on the electrophotographic photoconductor, the electrophotographic photoconductor having an outermost layer comprising a charge transport substance which emits fluorescence upon irradiation of UV rays in an amount of 30% by mass or more, comprising at least:

an irradiation unit configured to irradiate UV rays having a wavelength of 200 nm to 420 nm onto the electrophotographic photoconductor, and a measuring unit configured to measure fluorescence emitted from the charge transport substance in the outermost layer of the electrophotographic photoconductor.

10. The device for evaluating an electrophotographic photoconductor according to claim 9, wherein the measuring unit comprises an image receiving unit configured to receive imagewisely the fluorescence emitted from the electrophotographic photoconductor and an image-processing unit configured to image-process the image received into the image receiving unit.

11. The device for evaluating an electrophotographic photoconductor according to claim 10, wherein the image-processing unit comprises an algorithm to calculate a filming amount from image-processing information.

12. The device for evaluating an electrophotographic photoconductor according to claim 9, wherein the measuring unit comprises a light receiving unit, and the light receiving element is sensitive to the wavelength of the fluorescence emitted from the electrophotographic photoconductor.

13. A method for reusing an electrophotographic photoconductor, the electrophotographic photoconductor having an outermost layer comprising a charge transport substance which emits fluorescence upon irradiation of UV rays in an amount of 30% by mass or more, comprising:

evaluating reusability of a used electrophotographic photoconductor, and selecting and reusing a usable electrophotographic photoconductor, wherein the electrophotographic photoconductor is evaluated as to the reusability by a method for evaluating an electrophotographic photoconductor in terms of filming occurrence, which comprises irradiating UV rays having a wavelength of 200 nm to 420 nm onto the electrophotographic photoconductor and measuring fluorescence emitted from the charge transport substance in the outermost layer of the electrophotographic photoconductor.

14. The method for reusing an electrophotographic photoconductor according to claim 13, wherein the used electrophotographic photoconductor is one that has experienced 1000 or more sheets of imaging.

15. The method for reusing an electrophotographic photoconductor according to claim 13, wherein the used electrophotographic photoconductor has a ten-point average surface roughness (Rz) of 0.01 μm to 3 μm.

16. The method for reusing an electrophotographic photoconductor according to claim 13, wherein the electrophotographic photoconductors comprises at least an undercoat layer, a charge generating layer, and a charge transport layer in this order on a support, and the undercoat layer comprises a pigment.

17. An image forming method, comprising at least:

forming an electrostatic latent image on an electrophotographic photoconductor, the electrophotographic photoconductor having an outermost layer comprising a charge transport substance which emits fluorescence upon irradiation of UV rays in an amount of 30% by mass or more, developing the electrostatic latent image using a toner to form a visible image, transferring the visible image onto a recording medium, and fixing the transferred visible image on the recording medium, wherein the electrophotographic photoconductor is one evaluated to be usable by a method for reusing an electrophotographic photoconductor, comprising:

evaluating reusability of a used electrophotographic photoconductor, and selecting and reusing a usable electrophotographic photoconductor, wherein the reusability is evaluated in terms of filming occurrence by irradiating UV rays having a wavelength of 200 nm to 420 nm onto the electrophotographic photoconductor and measuring fluorescence emitted from the charge transport substance in the outermost layer of the electrophotographic photoconductor.

* * * * *